United States Patent
Abe et al.

(10) Patent No.: US 7,110,666 B2
(45) Date of Patent: Sep. 19, 2006

(54) ELECTRONIC DEVICE, PHOTOGRAPHING CONTROL METHOD, PHOTOGRAPHING CONTROL PROGRAM, AND PROCESSOR

(75) Inventors: Yuuichi Abe, Kawasaki (JP); Fumihiko Yoshizawa, Kawasaki (JP); Muneyasu Miyamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/216,095

(22) Filed: Sep. 1, 2005

(65) Prior Publication Data

US 2005/0286883 A1    Dec. 29, 2005

Related U.S. Application Data

(63) Continuation of application No. PCT/JP04/00175, filed on Jan. 14, 2004.

(30) Foreign Application Priority Data

Mar. 6, 2003   (WO) .............. PCT/JP03/02641

(51) Int. Cl.
  *G03B 17/18* (2006.01)
  *G03B 17/38* (2006.01)
(52) U.S. Cl. .............. 396/59; 396/266; 396/283; 396/287
(58) Field of Classification Search ............ 396/56, 396/59, 171, 266, 263, 283, 429; 348/207.99, 348/231.99
See application file for complete search history.

(56) References Cited

U.S. PATENT DOCUMENTS

| 6,738,572 B1* | 5/2004 | Hunter ................. 396/56 |
| 2003/0151669 A1* | 8/2003 | Robins et al. ......... 348/207.99 |
| 2004/0032507 A1 | 2/2004 | Mun |
| 2005/0157174 A1 | 7/2005 | Kitamura et al. |

FOREIGN PATENT DOCUMENTS

| JP | 7-175105 | 7/1995 |
| JP | 10-31265 | 2/1998 |
| JP | 2002-290818 | 10/2002 |
| JP | 2002-305566 | 10/2002 |
| JP | 2003-198892 | 7/2003 |
| JP | 2004-80790 | 3/2004 |
| KR | 10-2004-0016530 | 2/2004 |
| WO | WO 03/053027 A1 | 6/2003 |

* cited by examiner

*Primary Examiner*—W. B. Perkey
(74) *Attorney, Agent, or Firm*—Westerman, Hattori, Daniels & Adrian, LLP.

(57) ABSTRACT

An electronic device with a camera function, an electronic device, a photographing control method, a photographing control program, and a processor is provided with a preventive function to block inappropriate photographing such as spy shots. A photographing reporting section (54, 54A, 54B) issues a reporting information for photographing. An information detecting section (58, 58A, 58B) detects this reporting information and a judging section (image output judging section 60) judges, by using the reporting information detected at the information detecting section, whether or not the photographing is permitted, whether or not an image is stored, and whether or not the image is altered.

29 Claims, 35 Drawing Sheets

ELECTRONIC DEVICE, PHOTOGRAPHING CONTROL METHOD, PHOTOGRAPHING CONTROL PROGRAM, AND PROCESSOR

CROSS-REFERENCE TO RELATED APPLICATIONS

This application is continuation of International Application No. PCT/JP2004/00175, filed on Jan. 14, 2004, now pending, herein incorporated by reference, which claims foreign priority from PCT/JP03/02641, herein incorporated by reference.

BACKGROUND OF THE INVENTION

1. Field of the Invention

The present invention relates to an electronic device such as mobile phones with a camera and digital cameras, and relates to an electronic device, a photographing control method, a photographing control program, and a processor, which avoid attempts to disable preventive functions to block inappropriate photographing such as spy shots by emitting a shutter sound or the like at the time of photographing.

As digital cameras become commonplace, various electronic devices such as a mobile phone with a camera and an information-processing device with a camera function are becoming popular. Since a mobile phone with a camera has a phone function and a camera function, its usability of these two functions in a single body as well as its multiplier capabilities such as storing, editing, and transmitting/receiving of shot images, phone conversation, photographing and processing of the shot images enhance its convenience. In such a mobile phone with a camera, in view of privacy protection, for example, a shutter sound is emitted as a notifying sound at the time of still image capturing (beginning of photographing) in order to inform people around of the photographing action. Such a function of preventing spy shots by a notifying sound serves as an impetus for malicious people to refrain from committing stealthy acts, by informing people around of the photographing action.

2. Description of the Related Art

A mobile phone with a camera has a basic structure shown in FIG. 1, for example. FIG. 1 shows an overview of a camera function section in a mobile phone with a camera. In this mobile phone 2, an image formed through a lens 4 is detected at a camera sensor 6. The image as an analog signal is converted into a digital signal via an analog-digital converter (ADC: Analog Digital Converter) 8, and then added to a processor 10. This image is displayed on an LCD (Liquid Crystal Display) 14, an image display unit through this processor 10 via a bus 12. In this kind of mobile phones, capturing of the image on the finder is prepared by pressing halfway down a shutter button disposed on the main unit of the mobile phone, and a photographing operation completes by pressing the shutter button all the way down. A shot image is saved in a RAM (Random Access Memory) 16 in synchronization with the shutter operation. At this time, when the shutter button is pressed all the way down, a shutter sound information read from a FLASH (flash memory) 18 is converted into a shutter sound signal by the processor 10 and outputted, and then added to an amplifier (SPK-AMP: Speaker-Amplifier) 20. The shutter sound signal amplified by the amplifier 20 is emitted from a speaker 22 as a shutter sound. This shutter sound becomes a notice of the shutter operation to the person who takes pictures or to the subject of photographing.

In this mobile phone 2, the photographing operation is described with reference to FIG. 2. FIG. 2 shows the photographing operation. In the camera operation mode and in the finder mode (step S1), an image representing the subject formed through the lens 4 is displayed on the LCD 14. At this time, it is judged whether or not the camera operation mode is finished (step S2), and for example, by switching to the phone call mode, the camera operation mode is finished. If the camera operation mode is maintained, it is judged whether or not the operation switches to the capture mode (step S3). With this situation, pressing the shutter button halfway down switches to the capture mode (step S4) and it is judged whether or not the photographing is performed (step S5). That is, by moving the shutter button from the state of halfway down to the state of all the way down, the photographing operation is completed and the image displayed on the LCD 14 is captured as a still image. Then a shutter sound indicating the shutter operation is emitted (step S6), and the image data captured by the photographing is saved in the RAM 16 (step S7), then the operation returns to the finder mode (step S1).

In such a mobile phone 2, the shutter sound emitted at the time of still image capturing is sounded out without condition, and even if the people around notice the photographing action, it is only after the picture was taken, and the picture has been saved irrespective of the intentions of photographing action. On top of that, the shutter sound is configured to emit from the speaker 22 built in the main unit of the mobile phone so that there is a possibility that malicious users may block the output of shutter sound through easy modifications of the mobile phone 2 such as cutting a wiring 24 on the input side of the speaker 22.

In this way, there is a risk that malicious users may disable the function to prevent spy shots easily by abusing the portability and convenience of conventional electronic devices having a camera function, and take an antisocial behavior such as stealthy photographing actions. In addition, there is a problem as well that the images are easily erasable so that no evidence of the spy shots is left.

In regard to such functions to prevent spy shots, for example, a camera with a mute device disclosed in Japanese Patent Application Laid-Open Publication No. H 07(1995)-175105 enables photographing without considering the subject or the people around by silencing operational sound of the camera, so that it has a risk of being ill-used for spy shots.

Furthermore, in a device for preventing stealthy photographing disclosed in Japanese Patent Application Laid-Open Publication No. H10(1998)-31265, in order to prevent a photographing function by a remote control from being abused, a warning sound is outputted at the time of photographing regardless of the intentions of a person who takes a picture. But even with this device for preventing stealthy photographing, if a connecting wire between a warning sound generating part and a speaker is cut, generation of warning sound may be blocked, so that there is a risk that the function to prevent stealthy photographing may be disabled.

Moreover, in a portable terminal disclosed in Japanese Patent Application Laid-Open Publication No. 2002-290818, taking a picture is inhibited when the main unit is slanted at an unnatural angle. Stealthy photos are not always taken at an unnatural angle so that judging stealthy photographing actions by the photographing angle has a risk of hindering a normal photographing.

SUMMARY OF THE INVENTION

It is therefore an object of the present invention to provide an electronic device with a camera function, a photographing control method, a photographing control program, and a processor, in which the above described problems in the conventional art have been solved.

More specific object of the present invention is to enhance a function to prevent inappropriate photographing such as spy shots by an electronic device with a camera function.

In other words, the object of the present invention is to enhance a function to prevent inappropriate photographing so that the function will serve as an impetus to refrain from committing inappropriate photographing such as spy shots by electronic devices with a camera function.

To attain the above-described object, an electronic device of the present invention is an electronic device with a camera function, comprising a photographing reporting section that issues a reporting information for photographing; an information detecting section that detects the reporting information issued by this photographing reporting section; and a judging section that judges whether or not the photographing is permitted by using the reporting information detected at this information detecting section. In this electronic device, the reporting information representing the photographing may be various types of information such as sound and light that are generated during the camera operation mode, or a pilot lamp illuminating regardless of the camera operation mode.

This electronic device outputs the reporting information for photographing from the photographing reporting section and this reporting information is detected at the information detecting section. Thereby, the judging section judges whether or not the photographing is permitted, by using the reporting information detected at the information detecting section. The absence of detected reporting information for some reason at the information detecting section implies an anomalous condition, and in that case, the judging section prohibits the photographing. Here, the absence of detected reporting information at the information detecting section also includes an occasion where the detected information is different from the reporting information, i.e., the original information. Accordingly, as a result of prohibiting photographing in the case where the reporting information is not detected, the function to prevent inappropriate photographing such as spy shots and the photographing without consent is enhanced, and thus the above-mentioned object can be achieved.

Moreover, in this electronic device, since the photographing permission is conditional to issuance of the reporting information, to its detection, and to judgment of image storing by the detected reporting information, so that in comparison with the conventional preventions of spy shots that rely on the generation of shutter sound or the like, the function for preventing inappropriate photographing is enhanced; disabling the function for preventing inappropriate photographing is difficult; and the function serves as an impetus to refrain from committing inappropriate photographing such as spy shots, accordingly the above-mentioned object can be achieved.

To attain the above-described object, a configuration may also be used in which a storage section that stores the reporting information is provided, and the reporting information read from the storage section is outputted to the photographing reporting section.

To attain the above-described object, a configuration may also be used in which a comparing section is provided that compares the reporting information outputted from the photographing reporting section with the reporting information detected at the information detecting section, and the judging section makes a judgment on the basis of comparison result of this comparing section.

To attain the above-described object, a configuration may also be used in which a display section that displays an image is provided and the judging section judges whether or not the image is displayed on the display section, by using the reporting information detected at the information detecting section.

To attain the above-described object, a configuration may also be used in which a storage device that stores an image is provided and the judging section judges whether or not the image is saved in the storage device, by using the reporting information detected at the information detecting section.

To attain the above-described object, a configuration may also be used in which an image processing section that alters an image and a storage device that stores the image altered in the image processing section are provided, and the judging section judges whether or not the image is altered at the image processing section and saved in the storage device, by using the reporting information detected at the information detecting section.

To attain the above-described object, a configuration may also be used in which an information presenting section is provided, and the information presenting section is presented with the information representing whether or not the image is saved in the storage device, based on the judgment result of the judging section.

To attain the above-described object, a configuration may also be used in which the photographing reporting section emits either sound or light, or both as the reporting information, and the information detecting section detects either the sound or light, or both emitted by the photographing reporting section as the reporting information.

To attain the above-described object, a configuration may also be used in which the storage device further comprises a first storage section that saves an image temporarily by the shutter operation, and a second storage section that receives and saves the image from the first storage section on the basis of judging result of the judging section.

To attain the above-described object, an electronic device of the present invention is an electronic device with a camera function, comprising a transmitting section that transmits in synchronization with the shutter operation a reporting information requesting photographing permission to an opposite electronic device; a receiving section that receives a notifying information representing permission/prohibition of the photographing from the opposite electronic device; and a judging section that judges whether or not the photographing is permitted by using the notifying information received at this receiving section. In this case, a configuration may also be used in which the reporting information requesting photographing permission, which is transmitted from the above-described transmitting section to the opposite electronic device, is transmitted as a reporting signal that uses radio waves, sound waves, or light as a transmission medium.

To attain the above-described object, an electronic device of the present invention comprises a receiving section that receives a reporting information requesting photographing permission or a reporting information representing photographing transmitted from an opposite electronic device with a camera function; and an information presenting section that presents the reporting information received by this receiving section. In such a case where the above-described reporting information for requesting photographing permission is transmitted as a reporting signal that uses radio waves, sound waves, or light as transmission medium, then by receiving the reporting signal at the receiving section and by configuring that the reporting signal presents information for representing the photographing such as the shutter operation to the information presenting section as a voice or a picture, the above-described object can be achieved. That is, photographing reports are made possible. And in this case, this electronic device only needs to be capable of receiving the photographing information from the opposite electronic device and presenting the information, and does not need to have a camera function; however, may include the camera function as well.

To attain the above-described object, a photographing control method of the present invention is a photographing control method for an electronic device with a camera function, comprising the steps of issuing a reporting information representing the camera operation mode; detecting the reporting information outputted; and judging whether or not the photographing is permitted by using the reporting information detected at the information detecting section.

To attain the above-described object, a photographing control program of the present invention is a photographing control program executed by the electronic device with a camera function, including the steps of making a photographing reporting section issue a reporting information representing the camera operation mode; capturing the reporting information detected at the information detecting section; and judging whether or not the photographing is permitted by using the reporting information detected at the information detecting section.

To attain the above-described object, a processor of the present invention is the processor used for an electronic device with a camera function, and is configured to be connected to a camera sensor detecting an image through the above-described lens; a photographing reporting section that issues the reporting information representing the camera operation mode; an information detecting section that detects the reporting information issued by this photographing reporting section; a judging section that judges whether or not the photographing is permitted by using the reporting information detected at the information detecting section; and a storage device that stores the image, wherein the image obtained on the camera sensor is saved in the storage device, based on the judgment result of the judging section. According to this processor, in an electronic device with a camera function, preventions of inappropriate photographing such as spy shots can be achieved as described previously.

To attain the above-described object, a configuration may also be used in which a processor of the present invention is connected to a-camera sensor capturing an image through the above-described lens; a photographing reporting section that issues the reporting information representing the camera operation mode; an information detecting section that detects the reporting information issued by this photographing reporting section; a judging section that judges whether or not the photographing is permitted by using the reporting information detected at the information detecting section; and a storage device that stores the image, wherein the image is altered and saved in the storage device, based on the judgment result of the judging section.

To attain the above-described object, a configuration may also be used in which a processor of the present invention is connected to a camera sensor capturing an image through the above-described lens; a photographing reporting section that issues the reporting information representing the camera operation mode; an information detecting section that detects the reporting information issued by this photographing reporting section; a judging section that judges whether or not the photographing is permitted, by using the reporting information detected at this information detecting section; a storage device that stores the image; and an information presenting section that presents information, thereby the information representing the judgment result of the judging section is presented at the information presenting section.

To attain the above described object, a configuration may also be used in which a processor of the present invention is connected to a camera sensor capturing an image through the above-described lens; a transmitting section that transmits in synchronization with the shutter operation a reporting information requesting photographing permission to the opposite electronic device; a receiving section that receives a notifying information whether or not the photographing is permitted from an opposite electronic device; a judging section that judges whether or not the photographing is permitted by using the notifying information received by this receiving section; and a storage device that stores the image, wherein the image obtained on the camera sensor is captured into the storage device, based on the judgment result of the judging section.

To attain the above-described object, in the above-described processor, a configuration may also be used in which the storage device further comprises a first storage section that saves the image temporarily by the shutter operation and a second storage section that receives and saves the image from the first storage section, wherein the image in the first storage section is saved into the second storage section based on the judgment result of the judging section.

To attain the above-described object, in the above described processor, a configuration may also be used in which a storage section that stores the reporting information is provided, and the reporting information is outputted to the photographing reporting section from the storage section based on the shutter operation.

To attain the above-described object, in the above-described processor, a configuration may also be used in which the judging section judges based on the comparison result of the comparing section that compares the reporting information issued from the photographing reporting section with the reporting information detected at the information detecting section, and supplies the reporting information to the comparing section.

As set forth hereinabove, according to the present invention, in an electronic device with a camera function, the function to prevent inappropriate photographing such as spy shots can be enhanced as well as attempts to disable preventive functions through modifications such as cutting a wire can be prevented, and thus an electronic device with enhanced security for the preventive function of inappropriate photographing can be realized.

That is, an electronic device of the present invention is configured to issue a reporting information representing the camera operation mode; detect the reporting information; and judge whether or not the photographing is permitted by using the reporting information, for example, whether or not the image is displayed, saved, or altered, and whether or not the information is presented, so that it is useful as the electronic device with a camera function, since it enhances prevention of inappropriate photographing such as spy shots by prohibiting the photographing, the image display, the image storage, the image alteration, or by presenting information and the like in the case where the reporting information is not obtained.

An electronic device of the present invention is configured to transmit in synchronization with the shutter operation a reporting information requesting photographing permission to an opposite electronic device; receive a notifying information from the opposite electronic device representing the photographing permission/prohibition; and judge whether or not the photographing is permitted by using this notifying information, so that it is useful as the electronic device with a camera function, since it enhances prevention of inappropriate photographing such as spy shots by prohibiting the photographing or the image display based on the notifying information.

An electronic device of the present invention receives a reporting information representing the photographing permission or the photographing transmitted from the opposite electronic device with a camera function and presents the reporting information to the information presenting section, so that the subject of photographing can notice an inappropriate photographing such as spy shots by the reporting information presented to the information presenting section in the electronic device carried by the subject, accordingly the electronic device can contribute to enhance the function to prevent inappropriate photographing such as spy shots.

A photographing control method of the present invention issues a reporting information representing the camera operation mode; detects the reporting information; judges whether or not the photographing is permitted by using the reporting information; and prohibits the photographing in the case where the reporting information is not obtained, so that in an electronic device with a camera function, the function to prevent inappropriate photographing such as spy shots can be enhanced.

A photographing control program of the present invention issues a reporting information representing the camera operation mode; detects the reporting information; makes the electronic device perform the processing of judgment whether or not the photographing is permitted by using the reporting information; and prohibits the photographing in the case where the reporting information is not obtained, so that in an electronic device with a camera function, the function to prevent inappropriate photographing such as spy shots can be enhanced.

Further, a processor of the present invention is used for an electronic device with a camera function, and configured to perform the processing of photographing permission and capturing of the image into the storage device on the basis of the judgment whether or not the photographing is inappropriate such as spy shots, so that the function to prevent inappropriate photographing such as spy shots can be enhanced.

BRIEF DESCRIPTION OF THE DRAWINGS

The above and other objects, features and advantages of the present invention will become more apparent from the following detailed description when taken in conjunction with the accompanying drawings.

DETAILED DESCRIPTION OF THE PREFERRED EMBODIMENTS

<First Embodiment>

An electronic device of the present invention includes a mobile phone with a camera, an information-processing terminal with a camera, a digital camera, and various information-processing devices. In such an electronic device, in a first embodiment, an electronic device with a camera function is configured such that a photographing reporting section issues a reporting information representing the camera operation mode, which information is detected at a detecting section, and then a judging section judges whether or not the photographing is permitted by using the reporting information. In the present invention, "photographing permission" or "photographing prohibition", which is an object of judgment, indicates any or all stages from shot image display to storage into a storage section.

Figure 1:
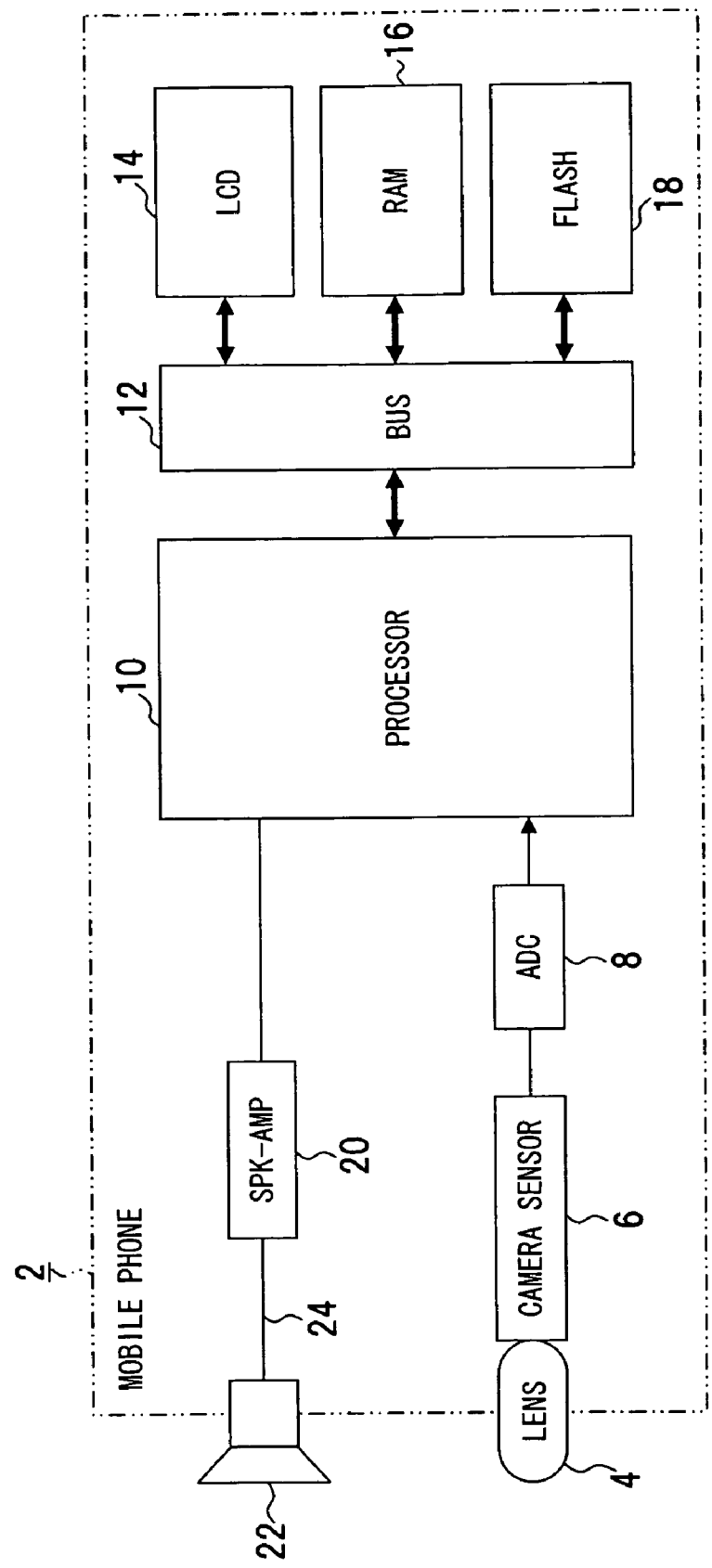
FIG. 1 is a block diagram showing a conventional mobile phone with a camera.
Figure 2:
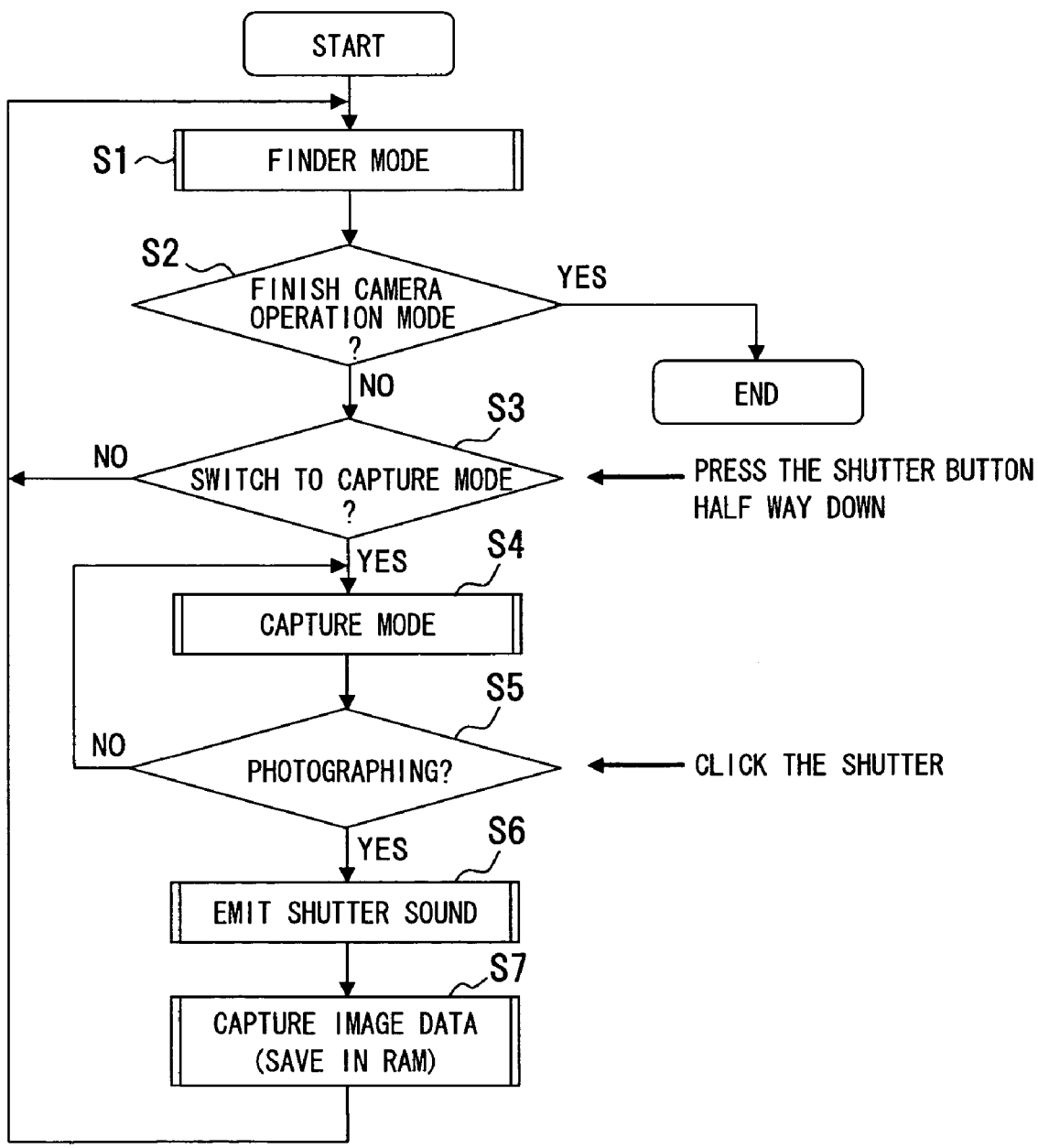
FIG. 2 is a flowchart showing a processing operation of photographing by a camera.
Figure 3:
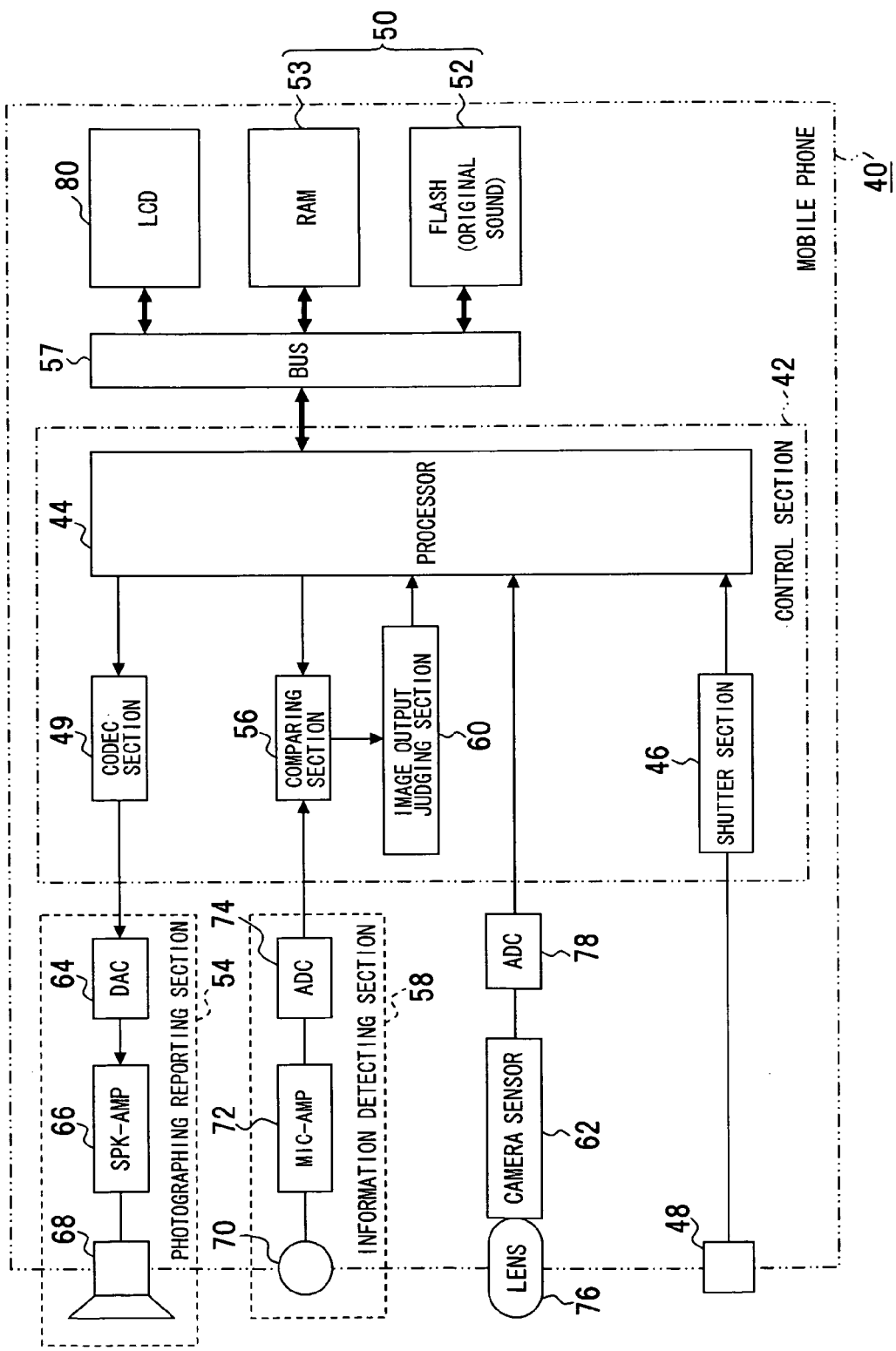
FIG. 3 is a block diagram showing a mobile phone in accordance with a first embodiment of the present invention.

FIG. 3 shows a mobile phone as the first embodiment of an electronic device of the present invention. In this mobile phone 40, a control section 42 performs various information processing and controls such as photographing permission or photographing prohibition control, image capture control, photographing reporting information output control, reporting information collection control, and image storage or deletion control. In this control section 42, a processor 44 is an information processing section comprised of CPU (Central Processing Unit) or the like, and executes various controls in addition to functions as an image processing section, such as image display control and image storage or image deletion control. A shutter section 46 detects the operation of a shutter button 48, and in this case, detects its states of halfway down and all the way down. This detected output is added to the processor 44, and with a state of the shutter button 48 pressed half way down, capture mode is set in, and with a state of all the way down, the photographing processing is executed. A CODEC (Compression/Decompression) section 49 is a means of decoding in order to regenerate original sound information read from a FLASH (flash memory) 52 in a storage device 50, which is a storage section to store the reporting information into a voice signal, and this voice signal is outputted to a photographing reporting section 54 as the reporting information of photographing. In FLASH 52, the reporting information used for a report of photographing is stored, and in this case, original sound information representing a shutter sound is stored as the reporting information. A comparing section 56 compares original sound that is the reporting information read from the FLASH 52 via a bus 57 into the processor 44 with detected sound that is the detected information at an information detecting section 58, and outputs, as a result of the comparison, a comparison result representing whether or not the detected sound matches the original sound. An image output judging section 60 as a judging section judging whether or not an image is saved, uses the reporting information, that is, uses the output representing the comparison result of the comparing section 56, and adds an output representing whether storage of the image obtained on a camera sensor 62 is permitted or prohibited to the processor 44. When an output permitting storage of the image is acquired, the image is saved via the bus 57 into a RAM (Random Access Memory) 53 that is a readable/writable storage element in the storage device 50 that is also an image storage section.

The photographing reporting section 54, based on the shutter operation, issues the reporting information as a report of photographing, and for example, emits a shutter sound for this reporting information. In this embodiment, the original sound outputted from the CODEC section 49 is converted into analog signals with a digital-analog converter (DAC: Digital Analog Converter) 64, which is then amplified with an amplifier (SPK-AMP: Speaker-Amplifier) 66, thereby a shutter sound is regenerated from a speaker 68 as the reporting information of photographing. Further, the information detecting section 58 detects the reporting information issued from the photographing reporting section 54 and adds the detected information to the comparing section 56. In this case, this information detecting section 58 detects, with a microphone 70, a shutter sound emitted from the speaker 68, and amplifies the detected signals with an amplifier (MIC-AMP: Microphone-Amplifier) 72, and adds to the comparing section 56 after having converted into digital signals with an analog-digital converter (ADC: Analog Digital Converter) 74.

Further, on a camera sensor 62, in the camera operation mode, an image of the subject is formed through a lens 76 and the image is detected. Since this image is analog signals, for convenience of processing, it is converted into digital signals with an Analog Digital Converter (ADC) 78 and added to the processor 44, then outputted via the bus 57 to an image display section, for example, to an LCD (Liquid Crystal Display) 80, and displayed.

Figure 4:
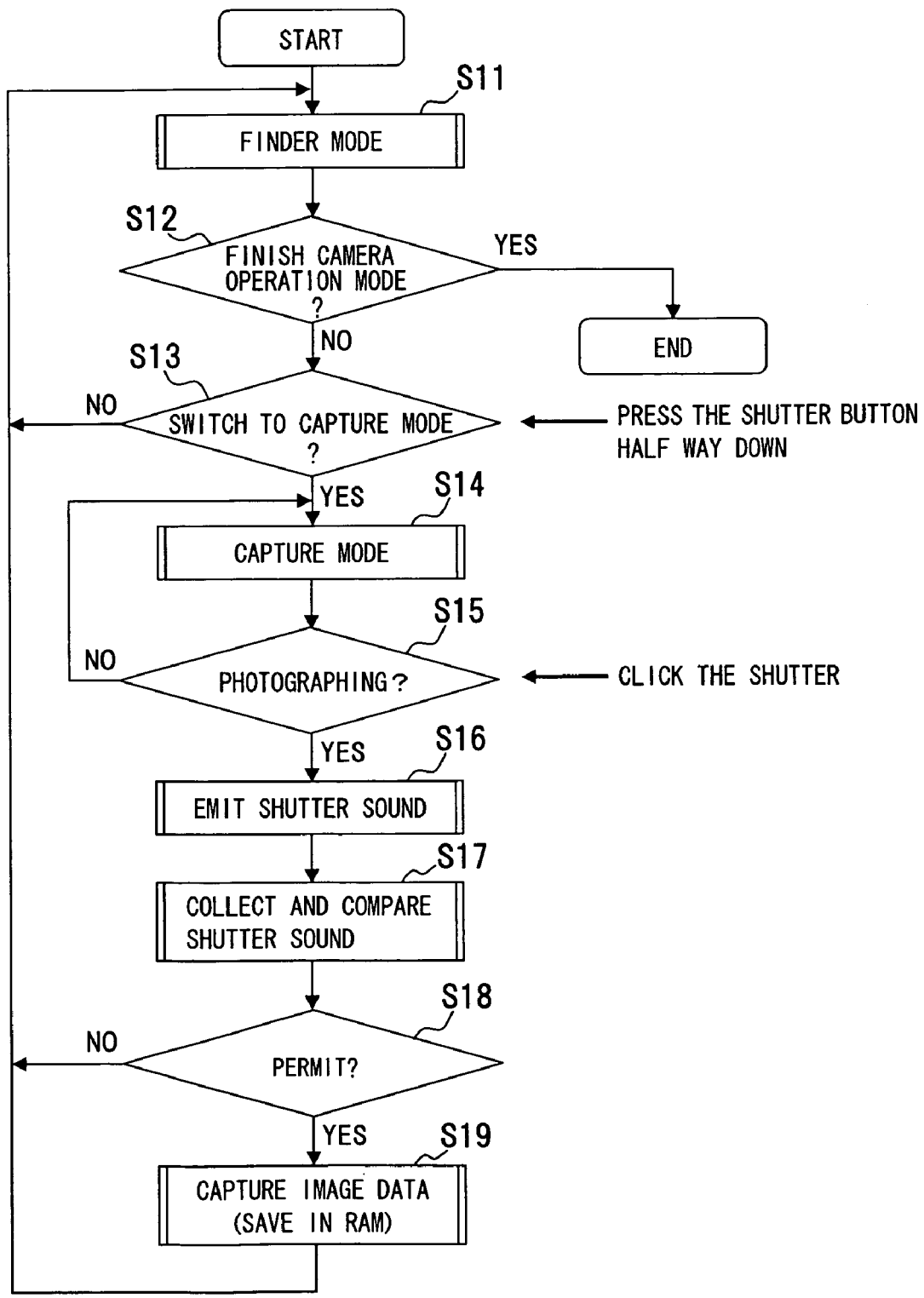
FIG. 4 is a flowchart showing an example of a photographing control method and the program thereof in accordance with a first embodiment of the present invention.

Regarding a mobile phone in accordance with the first embodiment, an example of a photographing control method and the photographing control program during photographing is described with reference to FIG. 4. FIG. 4 shows a flowchart that is an example of a photographing control method and the program thereof regarding photographing by a camera.

By switching to the camera operation mode, the finder mode is executed (step S11), and an image formed on the camera sensor 62 via the lens 76 is displayed on the LCD 80. Here, it is judged whether the camera operation mode is maintained or finished (step S12), and in this mobile phone with a camera function, for example, switching to the phone mode finishes the camera operation mode.

Moreover, if the camera operation mode is maintained, it is judged whether or not the processing is switched to the capture mode (step S13). In this case, pressing the shutter button 48 halfway down switches to the capture mode (step S14). With this state, aborting the shutter button 48 brings back the finder mode (step S11).

In the capture mode (step S14), an image on the finder is fixed and judged whether or not photographing is permitted (step S15). That is, when the shutter button 48 is pressed all the way down, the shutter operation completes as a photographing action, and a shutter sound is emitted from the speaker 68 in the photographing reporting section 54 (step S16). In this case, in this shutter operation, if the button is pressed all the way down with one operation, photographing is performed by passing a state of half way down in its process and by passing the capture mode with the half way down state in its process (step S13 to S16).

The shutter sound is collected and detected at the microphone 70 and then compared with the original sound (step S17). That is, the shutter sound is added to the comparing section 56 by having been converted into digital signals, which is then compared with the original sound read from the FLASH 52. Between this shutter sound and the original sound, either frequency component or level, or both of them are compared. On the basis of this comparison result, at the image output judging section 60, it is judged whether or not the photographing is permitted (step S18). If the comparison result is within a certain range, and if the difference of information between the shutter sound and the original sound is within a certain range, then a judgment of photographing permission is made. If the photographing is permitted by this judgment result, the image data is subject to storage, and saved in the RAM 53 (step S19), then the processing returns to the finder mode (step S11). Or, if the photographing is prohibited based on the judgment result, storing of the image data is subject to prohibition, and the processing returns to the finder mode (step S11).

As has been described hereinabove, in this first embodiment, in the camera operation mode, if the photographing is permitted by the shutter sound as the reporting information, the image is subject to storage into the RAM 53, and if the photographing is prohibited, the image is subject to deletion. In the camera operation mode, since it is judged by the detection of reporting information whether or not the photographing is permitted, so that the function to prevent inappropriate photographing can be enhanced, which can serve as an impetus for malicious people to refrain from committing inappropriate photographing or the like, and accordingly preventions of inappropriate photographing can be achieved.

In this first embodiment, the image is saved in the RAM 53 after photographing permission; however, a configuration may also be used in which a judgment is made about whether or not the image is displayed by using the reporting information, and if the photographing is permitted, the image is displayed on the LCD 80; while if the photographing is not permitted, the image is prohibited from displaying. Doing this can also enhance the function to prevent inappropriate photographing.

In the first embodiment, a shutter sound is used for the reporting information; however, for sounds as the reporting information of the present invention, various types of sound information such as a melody, sounds of musical instruments, cries of animals, and human voice message can be used, without limiting to the shutter sound.

Figure 5:
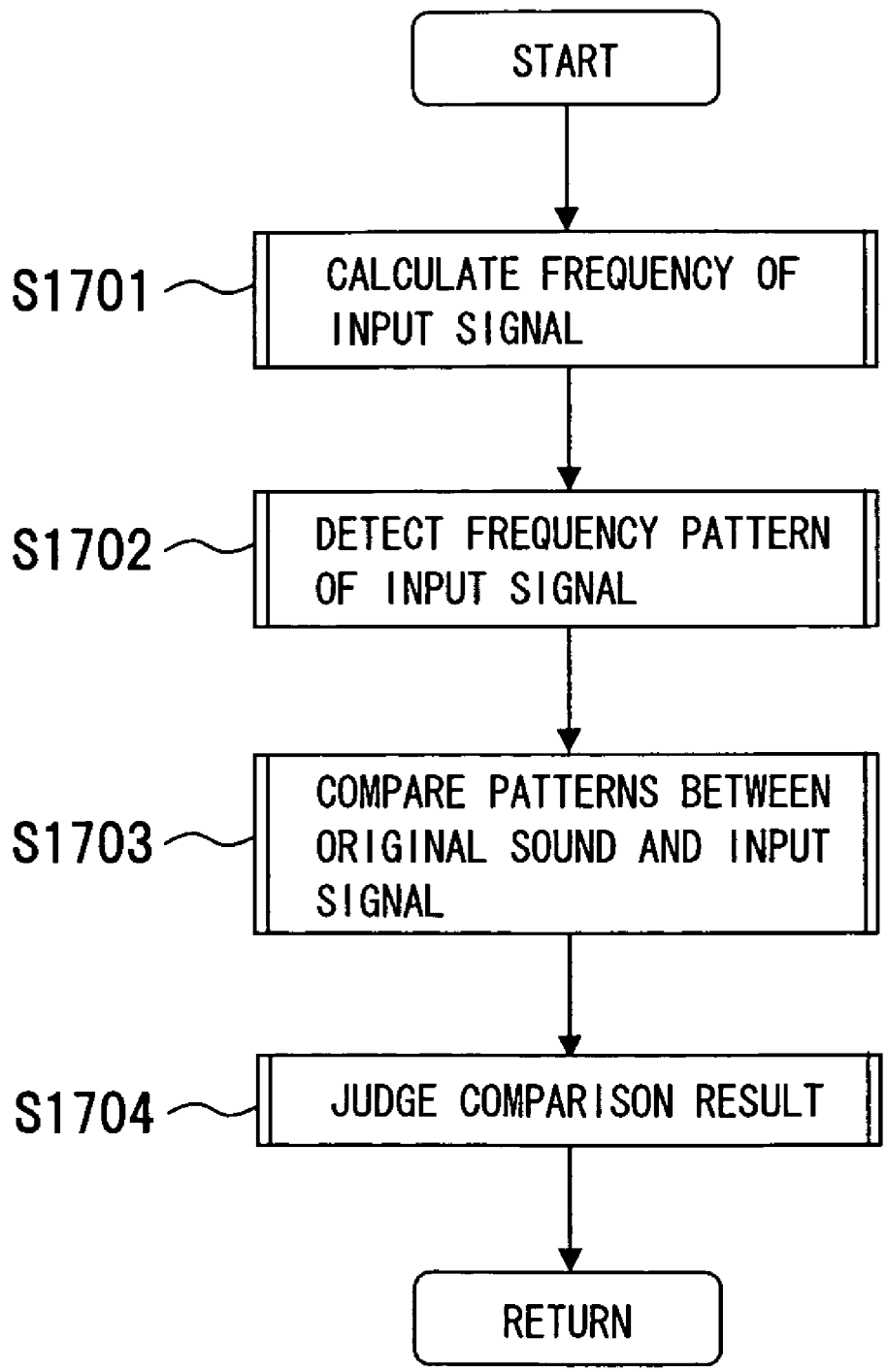
FIG. 5 is a flowchart showing a comparison processing of a comparing section.

Furthermore, in the mobile phone 40 in the first embodiment, the processing of the information detecting section 58 and the comparing section 56 (the processing of step S17 in the flowchart shown in FIG. 4) can be performed, for example, as shown in FIG. 5, by comparing frequency component of the shutter sound that is the detected reporting information, and by using this comparison result for judgment. When the shutter sound is detected at the microphone 70, frequency component of the input signals is detected; its frequency is calculated (step S1701); and its frequency pattern is detected (step S1702). In this case, frequency component is detected within the range of frequency that composes the shutter sound, and the range of frequency is specified previously from the original sound. By detecting this frequency component, a frequency pattern of the shutter sound can be found. By comparing pattern of the original sound with that of the input signal as comparison data (step S1703) and with this comparison, it can be found whether both match, equal, or not. After judging this comparison result (step S1704), the processing returns to step S18 (FIG. 4). By using this judgment result for a judgment of storing an image, processing with high reliability is made possible.

Figure 6:
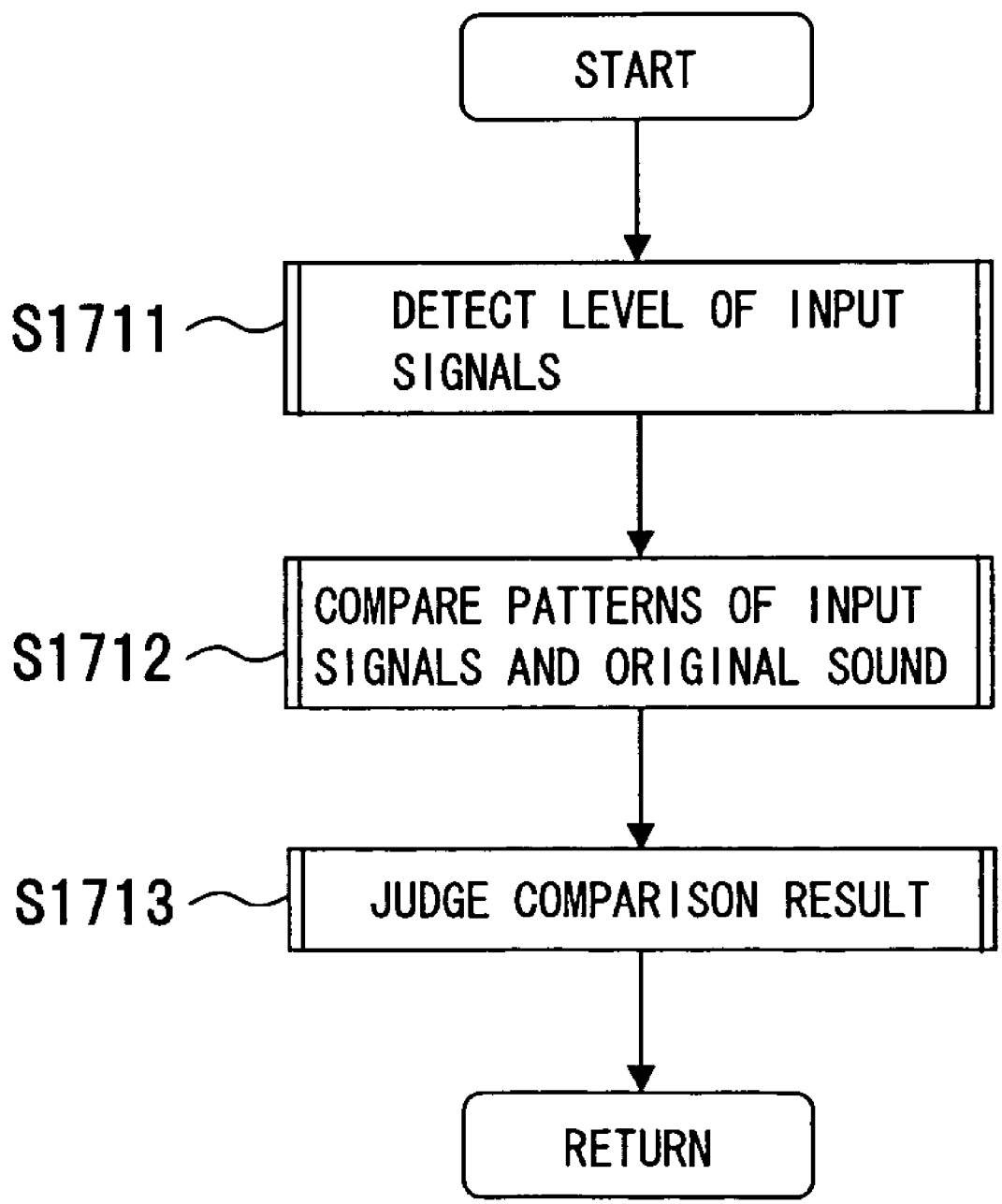
FIG. 6 is a flowchart showing a comparison processing of a comparing section.

Moreover, in the mobile phone 40 in this first embodiment, the processing of the information detecting section 58 and the comparing section 56 (the processing of step S17 in the flowchart shown in FIG. 4) can be performed, for example, as shown in FIG. 6, by comparing level of shutter sound that is the detected reporting information, and by using this comparison result for judgment. Level of input signals at the microphone 70 is detected (step S1711), and in this case, amplitude information (amplitude pattern) is extracted from the input signals. Next, as comparison data, comparison of patterns between the original sound and the input signals is performed (step S1712). In this case, the comparison is performed between amplitude pattern of the input signals and that of the extracted original sound. With this comparison, it can be found whether both match, equal, or not. After judging this comparison result (step S1713), the operation returns to step S18 (FIG. 4). By using this judgment result for the judgment to save an image, processing with high reliability is made possible.

In addition, although either the frequency comparison shown in FIG. 5 or the level comparison shown in FIG. 6 can be used, both of them can be used concurrently, and the processing that uses both in combination can enhance the recognition ratio of shutter sound, for example, by using the detected reporting information, and accordingly can achieve more reliable judgment for image storing.

<Second Embodiment>

A second embodiment of the present invention is an electronic device with a camera function, having a configuration in which an image is stored temporarily into a first storage section, and the image is stored into a second storage section in the case where the photographing is permitted. In this configuration, when no reporting information is detected, the image in the first storage section is deleted and image output from the first storage section, i.e., saving into the second storage section is prohibited.

Figure 7:
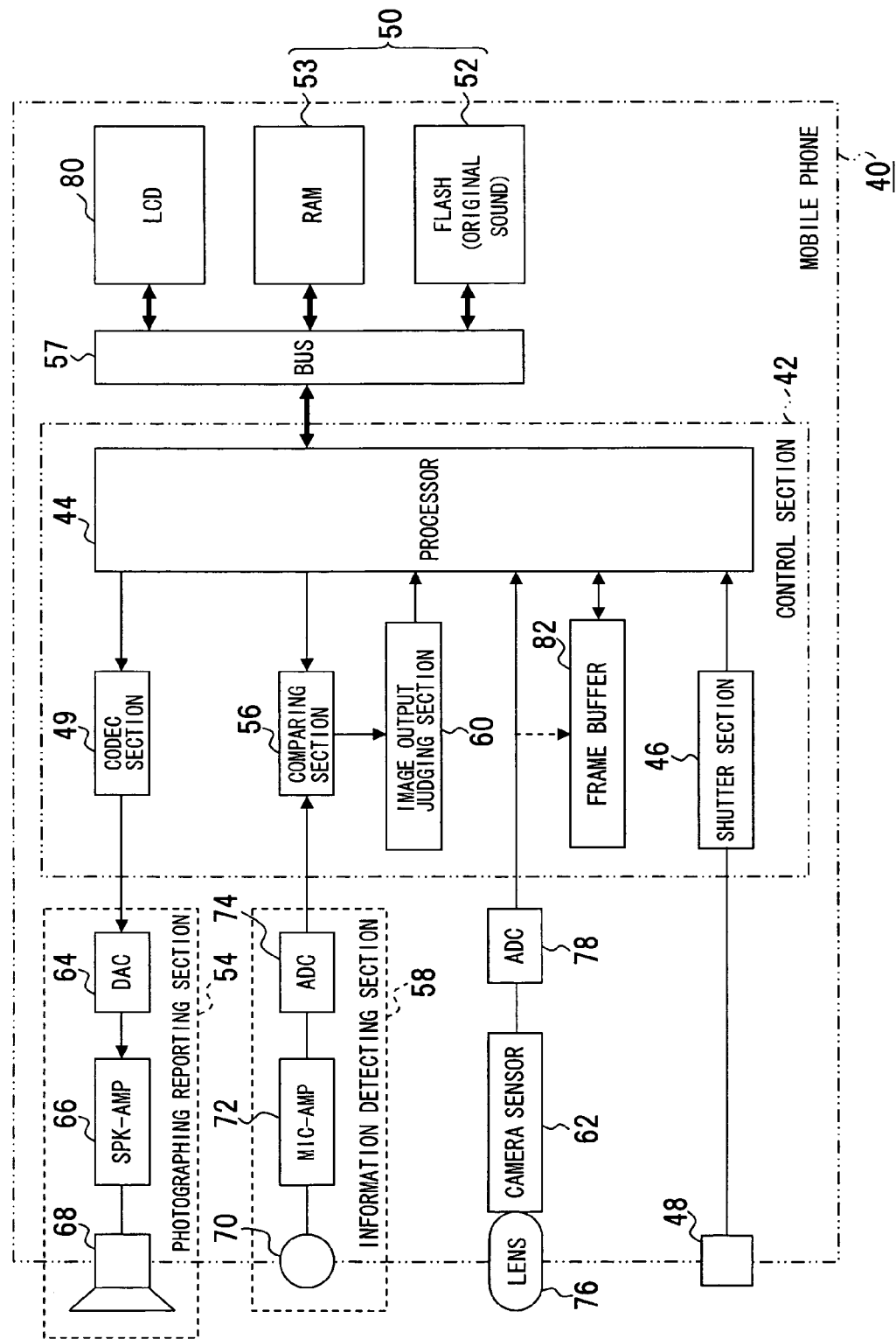
FIG. 7 is a block diagram showing a mobile phone in accordance with a second embodiment of the present invention.
Figure 8:
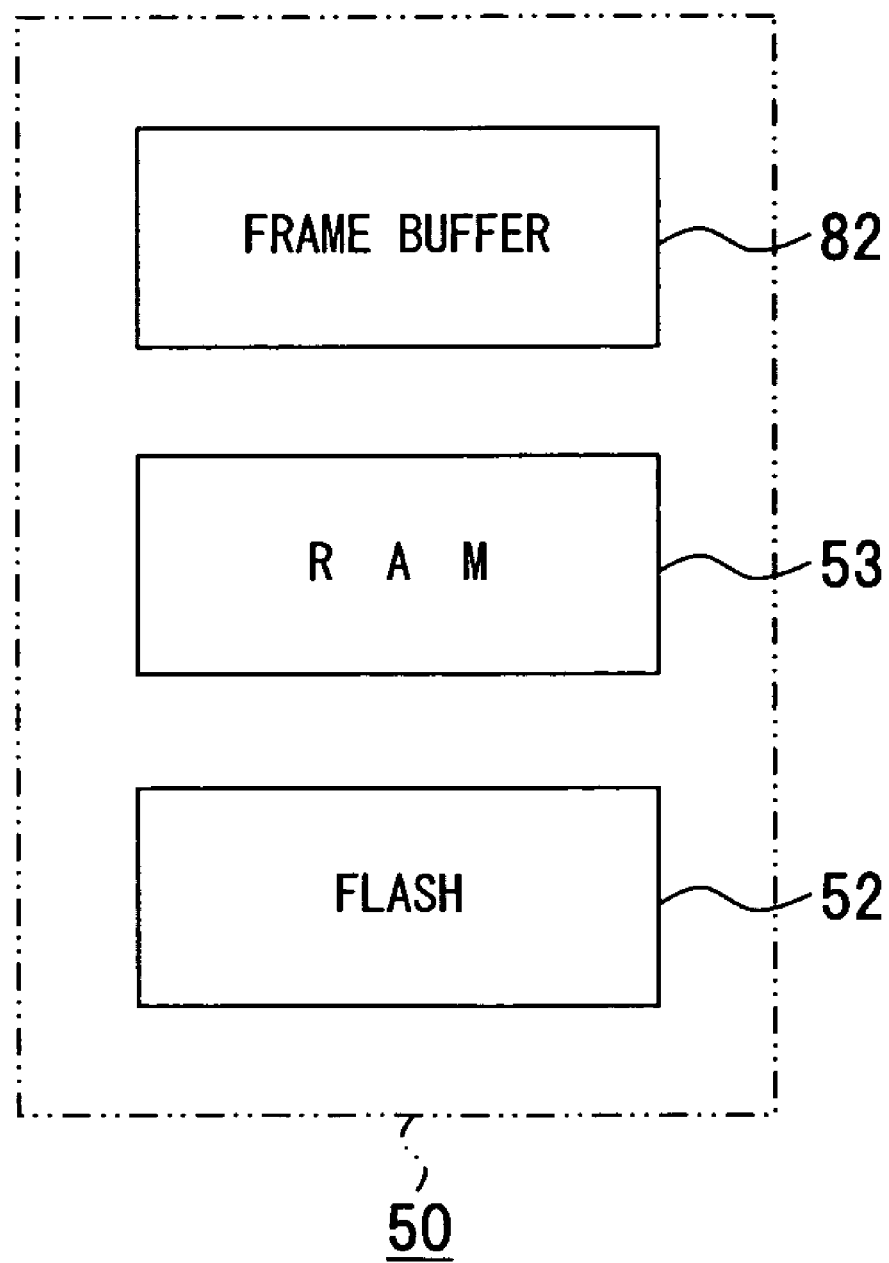
FIG. 8 is a block diagram showing an example of configuration of a storage device.

FIG. 7 shows a mobile phone in accordance with the second embodiment of an electronic device of the present invention. This mobile phone 40 is the one in accordance with the first embodiment to which a frame buffer 82 as the first storage section in a storage device 50 is added. The storage device 50 in this embodiment is comprised of, as shown in FIG. 8, the frame buffer 82 as the first storage section and a RAM 53 as well as a FLASH 52 as the second storage section. The frame buffer 82 is comprised of, for example, a RAM or the like that is disposed in the control section 42, and to which a shot image of the camera sensor 62 is added via the ADC 78, and used for saving the image temporarily. In this embodiment, image input from the ADC 78 is added to the processor 44, however, as indicated by dashed lines, a configuration may also be used in which by adding the image input from the ADC 78 to be stored into the frame buffer 82, the image input is then added to the processor 44 via this frame buffer 82. The configuration is the same as the first embodiment (FIG. 3) so that the same symbols are added to the same portions and descriptions of each section are omitted.

Figure 9:
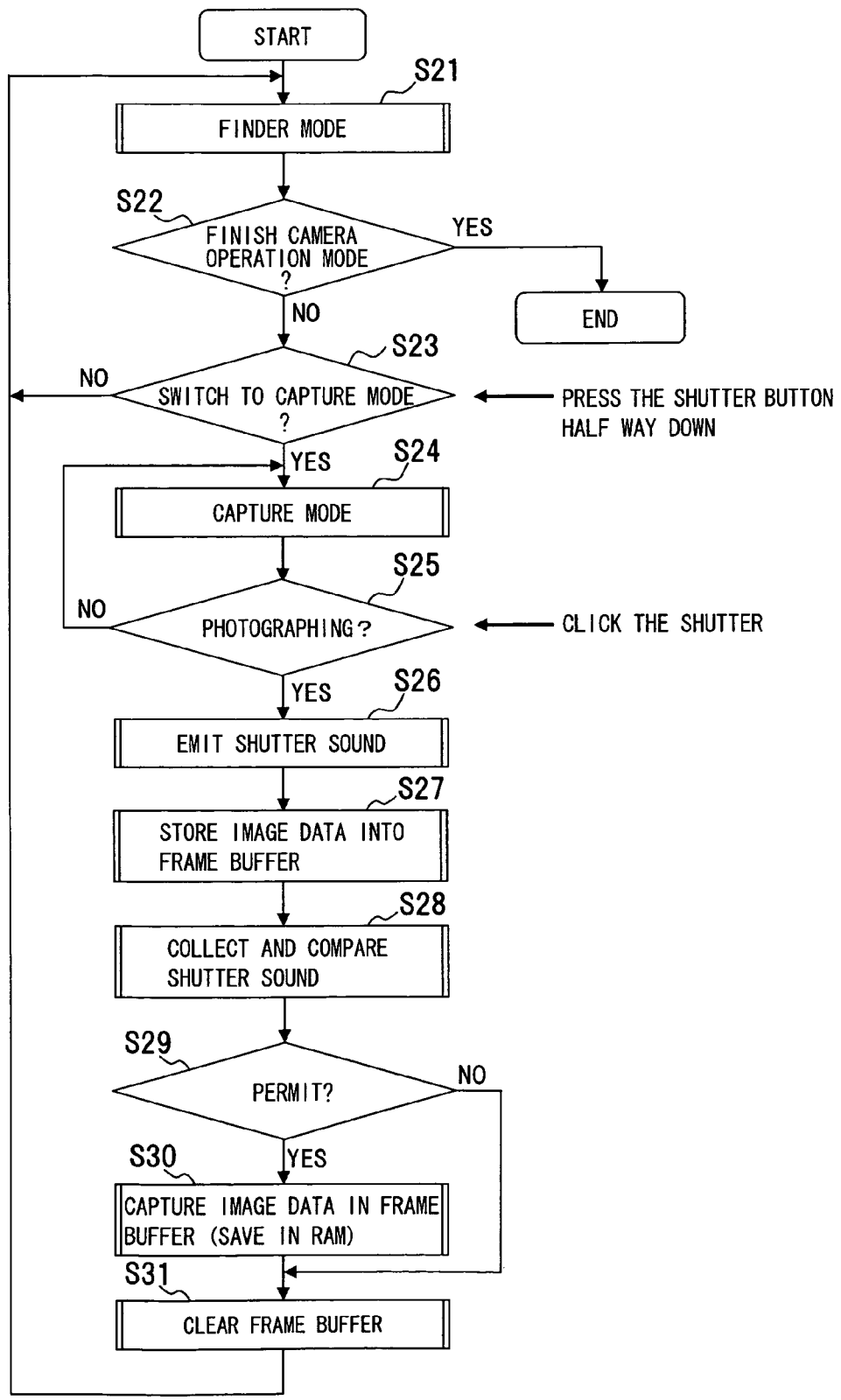
FIG. 9 is a flowchart showing an example of a photographing control method and the program thereof in accordance with a second embodiment of the present invention.

Regarding the mobile phone 40 in accordance with this second embodiment, the processing operation during photographing is described with reference to FIG. 9. FIG. 9 is a flowchart showing an example of a photographing control method and the program thereof with regard to preventions of spy shots.

Switching to the camera operation mode executes the finder mode (step S21), and an image is displayed on the LCD 80. Here, it is judged whether the camera operation mode is maintained or finished (step S22).

Further, if the camera operation mode is maintained, it is judged whether or not the processing is switched to the capture mode (step S23). In this case, pressing the shutter button 48 halfway down switches to the capture mode (step S24), and with this state, aborting the shutter button 48 brings back the finder mode (step S21).

It is judged through the capture mode (step S24) whether or not the photographing is permitted (step S25). When the shutter button 48 is pressed all the way down, the shutter operation completes as a photographing action, and a shutter sound is emitted from the speaker 68 of the photographing reporting section 54 (step S26). In this shutter operation, if the button is pressed all the way down with one operation, photographing is performed by passing a state of half way down in its process and by passing the capture mode with the half way down state in its process (step S23 to S26). And the image data is stored temporarily into the frame buffer 82 (step S27).

The shutter sound is collected and detected at the microphone 70 and then compared with the original sound (step S28). That is, the shutter sound is added to the comparing section 56 by having been converted into digital signals, which is then compared with the original sound read from the FLASH 52. Between this shutter sound and the original sound, either frequency component or level, or both of them are compared. On the basis of this comparison result, at the image output judging section 60, it is judged whether or not the photographing is permitted (step S29). If the comparison result is within a certain range, and if the difference of information between the shutter sound and the original sound is within a certain range, then a judgment of photographing permission is made. If the photographing is permitted by this judgment result, the image data in the frame buffer 82 is subject to storage, and saved in the RAM 53 (step 30), followed by deletion of the image data in the frame buffer 82 (step S31), then the processing returns to the finder mode (step S21). Or, if the photographing is prohibited by the judgment result, the image data in the frame buffer 82 is also deleted (step S31), and the processing returns to the finder mode (step S21).

As has been described hereinabove, while the image stored temporarily into the frame buffer 82 by the shutter operation is saved into the RAM 53 when the photographing is permitted on the basis of the judgment result using the shutter sound as the reporting information, otherwise the image is deleted so that the function to prevent inappropriate photographing can be enhanced.

In this case, in the mobile phone 40 in accordance with the second embodiment, a configuration may also be used in which whether the photographing is permitted or not is judged by using light as the reporting information, i.e., a judgment may be made about whether or not the image stored in the frame buffer 82 as the first storage section is saved into the RAM 53.

<Third Embodiment>

A third embodiment of an electronic device of the present invention is an electronic device with a camera function, having a configuration in which the photographing reporting section emits light as the reporting information representing the camera operation mode, and this light is detected at the information detecting section, and then by using the detected light, the judging section judges whether or not the photographing is permitted. In this configuration, the sound in the first embodiment has been replaced with light.

Figure 10:
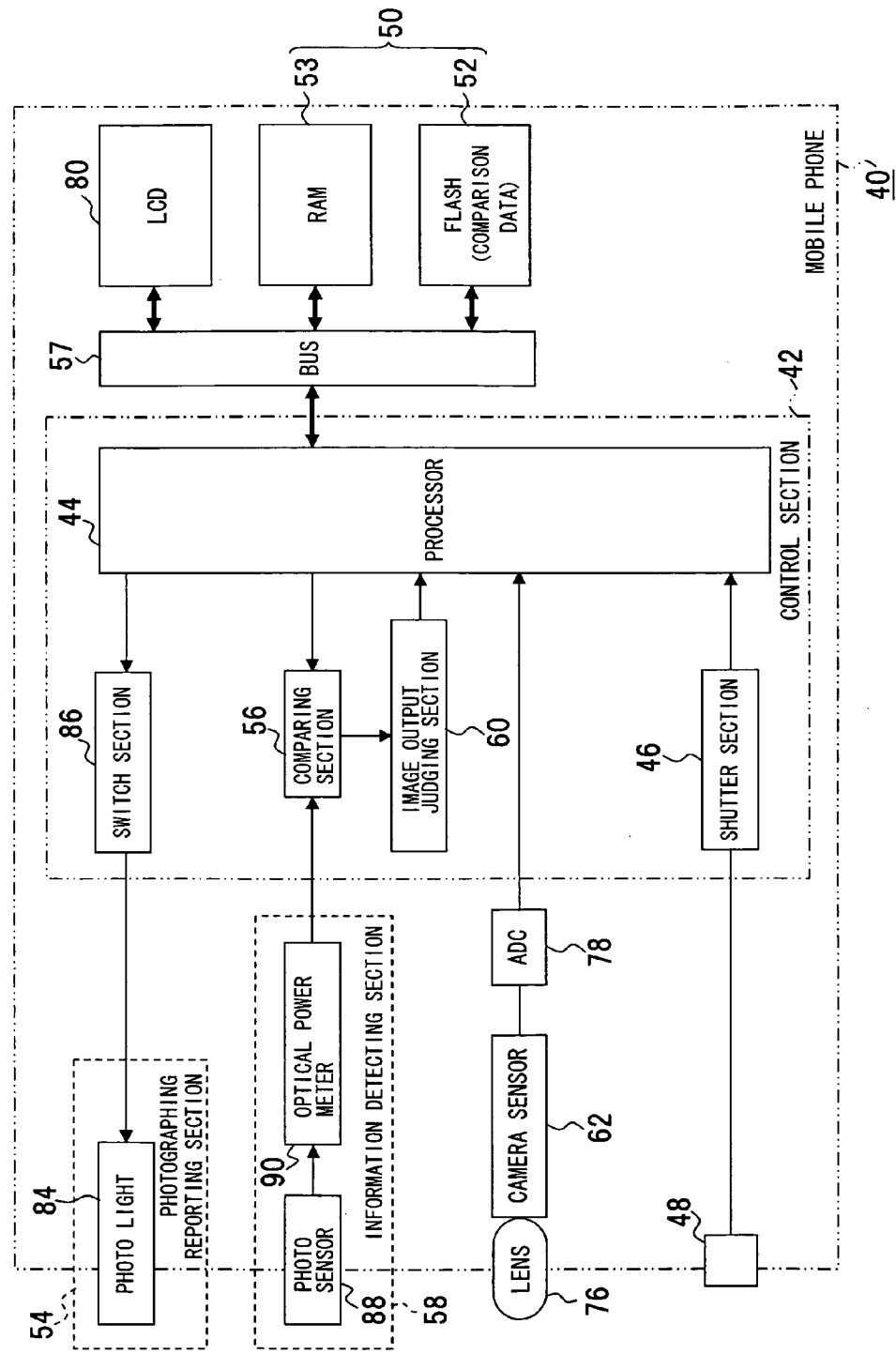
FIG. 10 is a block diagram showing a mobile phone in accordance with a third embodiment of the present invention.

FIG. 10 shows a mobile phone in accordance with the third embodiment of an electronic device of the present invention. In the control section 42 of this mobile phone 40, light is used for the reporting information issued from the photographing reporting section 54, and a photo light 84 is disposed as the source of light, and a switch section 86 is disposed as a means for switching of light-emitting operation. Therefore, in the information detecting section 58, a photo sensor 88 that receives light from the photo light 84 is disposed, and in order to detect the light-receptive level of light-receptive output at this photo sensor 88, an optical power meter 90 is disposed as a level detecting section. The FLASH 52 stores comparison data of light therein, and this comparison data is used for the comparison processing of the comparing section 56. At the comparing section 56, comparison data that is a predetermined value from the FLASH 52 is compared with the detected light that is detected information at the information detecting section 58. If the comparison result is within a certain range, then the image output judging section 60 inputs judgment result permitting photographing into the processor 44, otherwise inputs judgment result prohibiting photographing into the processor 44. Other configurations are the same as the first embodiment (FIG. 3) so that the same symbols are added to the same portions and the descriptions are omitted.

Figure 11:
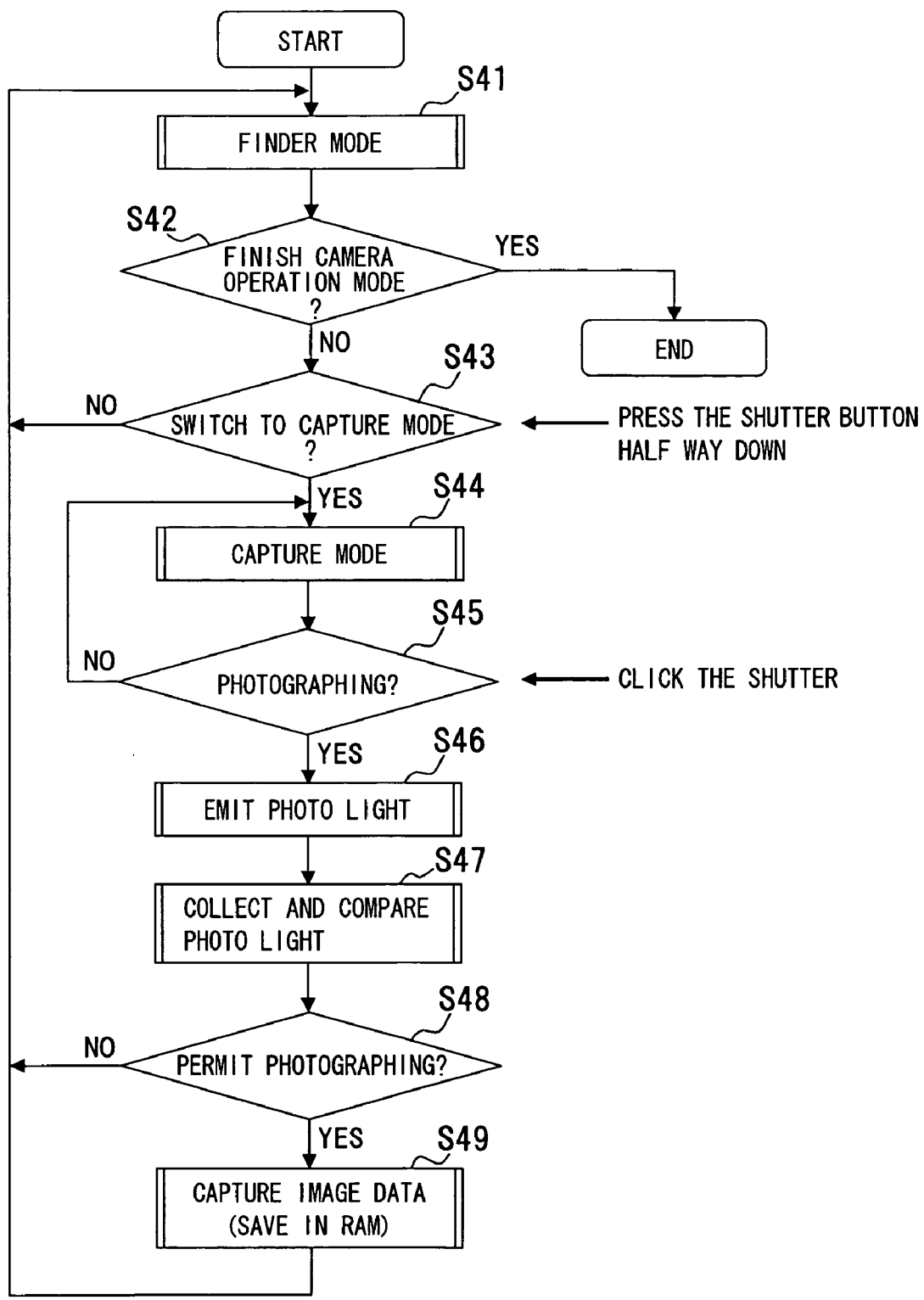
FIG. 11 is a flowchart showing an example of a photographing control method and the program thereof in accordance with a third embodiment of the present invention.

Regarding the mobile phone 40 in accordance with this third embodiment, the processing operation during photographing is described with reference to FIG. 11. FIG. 11 is a flowchart showing an example of a photographing control method and the program thereof with regard to preventions of spy shots.

Switching to the camera operation mode executes the finder mode (step S41), and an image formed on the camera sensor 62 through the lens 76 is displayed on the LCD 80. Here, it is judged whether the camera operation mode is maintained or finished (step S42), and in this mobile phone with a camera function, for example, switching to the phone mode finishes this camera operation mode.

Further, if the camera operation mode is maintained, it is judged whether or not the processing is switched to the capture mode (step S43). In this case, pressing the shutter button 48 halfway down switches to the capture mode (step S44), and with this state, aborting the shutter button 48 brings back the finder mode (step S41).

In the capture mode (step S44), the image on the finder is fixed and judged whether or not the photographing is permitted (step S45). That is, when the shutter button 48 is pressed all the way down, the shutter operation completes as a photographing action, and light is emitted from the photo light 84 in the photographing reporting section 54 (step S46). In this case, in this shutter operation, if the button is pressed all the way down with one operation, photographing is performed by passing a state of half way down in its process and by passing the capture mode with the half way down state in its process (step S43 to S46).

The light at the photo light 84 is collected and detected with the photo sensor 88 and then compared with the comparison data read from the FLASH 52 after the level-conversion with the optical power meter 90 (step S47). Based on this comparison result, at the image output judging section 60, it is judged whether or not the photographing is permitted (step S48). If the comparison result is within a certain range, and if the difference of information between the detected light and the comparison data is within a certain range, then a judgment of photographing permission is made. If this judgment result permits photographing, the image data is subject to storage, and saved in the RAM 53 (step 49), then the processing returns to the finder mode (step S41). Or, if the judgment result prohibits photographing, storage of the image is subject to prohibition, followed by deletion of the image data, and the processing returns to the finder mode (step S41).

As has been described hereinabove, in this third embodiment, in the camera operation mode, since light is used as the reporting information and if the photographing is permitted by the detected light, the image is saved into the RAM 53, and if the photographing is prohibited, the image is deleted so that the function to prevent inappropriate photographing can be enhanced, which can serve as an impetus for malicious people to refrain from committing inappropriate photographing or the like, and accordingly the prevention of inappropriate photographing can be achieved in the same way as in the first embodiment.

Also in this third embodiment, the image permitted for photographing is saved into the RAM 53; however, a configuration may also be used in which a judgment is made about whether or not the image is displayed by using the reporting information, and in the case where the photographing is permitted, the image is displayed on the LCD 80; while if the photographing is not permitted, the image is prohibited from displaying. Doing this can also enhance the function to prevent inappropriate photographing.

<Fourth Embodiment>

A fourth embodiment of an electronic device of the present invention is an electronic device with a camera function, having a configuration in which the photographing reporting section uses both light and sound as the reporting information representing the camera operation mode, wherein one information detecting section detects sound while the other detects light, and the judging section judges whether or not the photographing is permitted by using the detected sound and light. In this configuration, the functions in the first and the third embodiments are used in combination.

Figure 12:
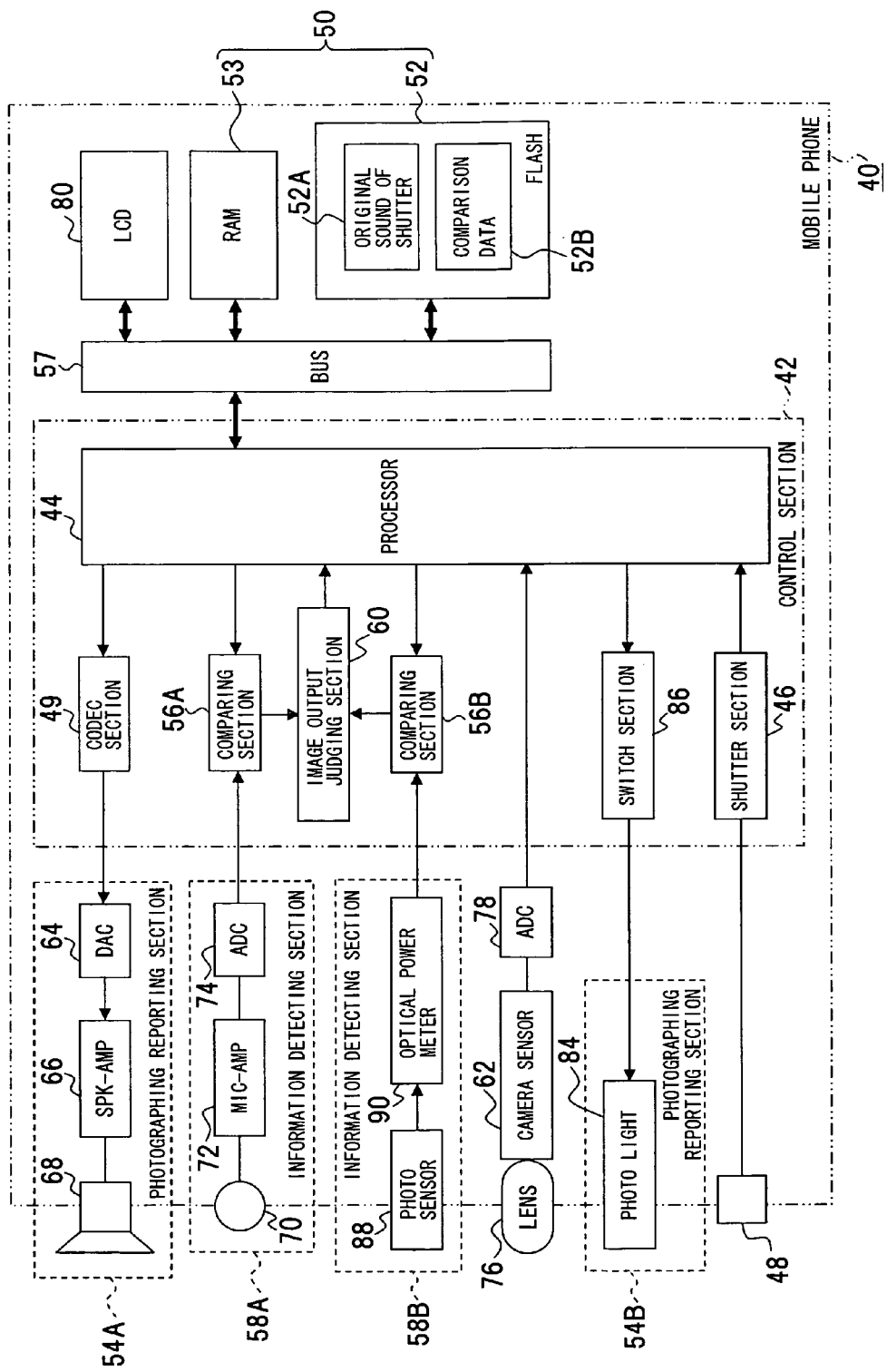
FIG. 12 is a block diagram showing a mobile phone in accordance with a fourth embodiment of the present invention.

FIG. 12 shows a mobile phone in accordance with the fourth embodiment of an electronic device of the present invention. This mobile phone 40 comprises a first photographing reporting section 54A using a shutter sound as the reporting information representing the camera operation mode; a first information detecting section 58A detecting the reporting information in response to this photographing reporting section 54A; a second photographing reporting section 54B using light as the reporting information; and a second information detecting section 58B detecting the reporting information in response to this photographing reporting section 54B. The control section 42 is equipped with the first and second comparing sections 56A, 56B, and the image output judging section 60 that judges whether or not the photographing is permitted based on the comparison result of respective comparing section 56A, 56B. The photographing reporting section 54A has the same configuration as the photographing reporting section 54 in the first or the second embodiment (FIG. 3 or FIG. 7); the photographing reporting section 54B has the same configuration as the photographing reporting section 54 in the third embodiment (FIG. 10); the information detecting section 58A has the same configuration as the information detecting section 58 in the first or the second embodiment (FIG. 3 or FIG. 7); and the information detecting section 58B has the same configuration as the information detecting section 58 in the third embodiment (FIG. 10). In this case, two storage sections, 52A, 52B are disposed in the FLASH 52, and the original sound of shutter is stored in the storage section 52A, while the comparison data of light is stored in the storage section 52B. Others are the same as those of the first to the third embodiment so that the same symbols are added to the same portions and the descriptions are omitted.

Figure 13:
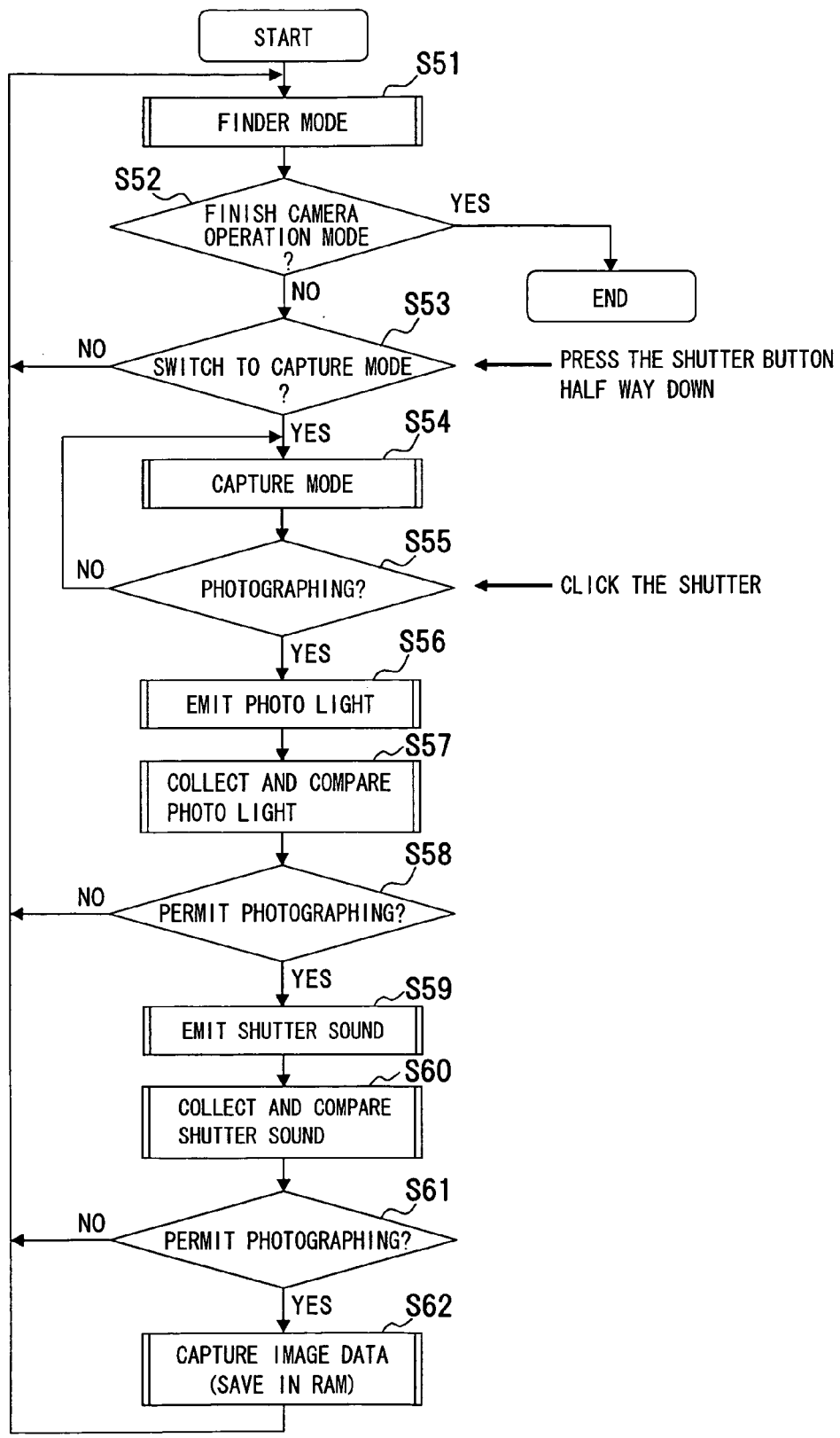
FIG. 13 is a flowchart showing an example of a photographing control method and the program thereof in accordance with a fourth embodiment of the present invention.

Regarding the mobile phone 40 in accordance with this fourth embodiment, the processing operation during photographing is described with reference to FIG. 13. FIG. 13 is a flowchart showing an example of a photographing control method and the program thereof with regard to preventions of spy shots.

Switching to the camera operation mode executes the finder mode (step S51), and an image formed on the camera sensor 62 through the lens 76 is displayed on the LCD 80. Here, it is judged whether the camera operation mode is maintained or finished (step S52).

Further, if the camera operation mode is maintained, it is judged whether or not the processing is switched to the capture mode (step S53). In this case, pressing the shutter button 48 halfway down switches to the capture mode (step S54). With this state, aborting the shutter button 48 brings back the finder mode (step S51).

In the capture mode (step S54), the image on the finder is fixed and judged whether or not the photographing is permitted (step S55). That is, when the shutter button 48 is pressed all the way down, the shutter operation completes as a photographing action, and light is emitted from the photo light 84 in the photographing reporting section 54 (step S56). In this case, in this shutter operation, if the button is pressed all the way down with one operation, photographing is performed by passing a state of half way down in its process and by passing the capture mode with the half way down state in its process (step S53 to S56).

The light from the photo light 84 is collected and detected with the photo sensor 88 and then added to the comparing section 56B after its level detection with the optical power meter 90, followed by a comparison with the comparison data of light read from the FLASH 52 (step S57). Based on this comparison result, at the image output judging section 60, it is judged whether or not the photographing is permitted (step S58). If the comparison result is within a certain range, and if the difference of information between the detected light and the comparison data is within a certain range, then a judgment of photographing permission is made. Otherwise, photographing is prohibited and the processing returns to the finder mode (step S51). When the photographing is permitted based on this judgment result, the shutter sound as the reporting information is emitted from the speaker 68 in the photographing reporting section 54A (step S59).

This shutter sound is collected and detected with the microphone 70 and then compared with the original sound (step S60). In this case, the shutter sound is added to the comparing section 56A by having been converted into digital signals, which is then compared with the original sound read from the FLASH 52. Between this shutter sound and the original sound, either frequency component or level, or both of them are compared. Based on this comparison result, at the image output judging section 60, it is judged whether or not the photographing is permitted (step S61). If the comparison result is within a certain range, and if the difference of information between the shutter sound and the original sound is within a certain range, then a judgment of photographing permission is made. If the photographing is permitted by this judgment result, the image data is permitted to storage, and the image data is saved into the RAM 53 (step 62), then the processing returns to the finder mode (step S51). Or, if the judgment result prohibits the photographing, storage of the image data is prohibited, and the processing returns to the finder mode (step S51).

As has been described hereinabove, in this fourth embodiment, in the camera operation mode, both light and the shutter sound are used as the reporting information. First, light is emitted by the shutter operation and if the photographing is permitted by the detected light, then the shutter sound is emitted and if the collected sound permits the photographing, then the image is saved into the RAM 53. Or, if the photographing is prohibited, then the image is deleted, so that the function to prevent inappropriate photographing can be all the more enhanced, which can serve as an impetus for malicious people to refrain from committing inappropriate photographing or the like, and accordingly the prevention of inappropriate photographing can be achieved.

In this case, in this fourth embodiment, a configuration may also be used in which a judgment is made about whether or not the image stored in the frame buffer 82 as the first storage section is saved into the RAM 53 as the second storage section by using both light and sound as the reporting information, as has been described in the second embodiment (FIG. 7, FIG. 8, and FIG. 9).

Further, in this fourth embodiment, the image is saved into the RAM 53 after photographing permission; however, a configuration may also be used in which a judgment is made about whether or not the image is displayed by using the reporting information, and in the case where the photographing is permitted, the image is displayed on the LCD 80; while if the photographing is not permitted, the image is prohibited from displaying. Doing this can also enhance the function to prevent inappropriate photographing.

<Fifth Embodiment>

A fifth embodiment of the present invention is an electronic device with a camera function, having a configuration in which an image is stored temporarily into the first storage section, and then the image is saved into the second storage section if the photographing is permitted, wherein the image having been stored in the first storage section will be altered and saved into the second storage section if it is judged that the photographing is not permitted. That is, inappropriate images are saved after having been corrected in this configuration.

Figure 14:
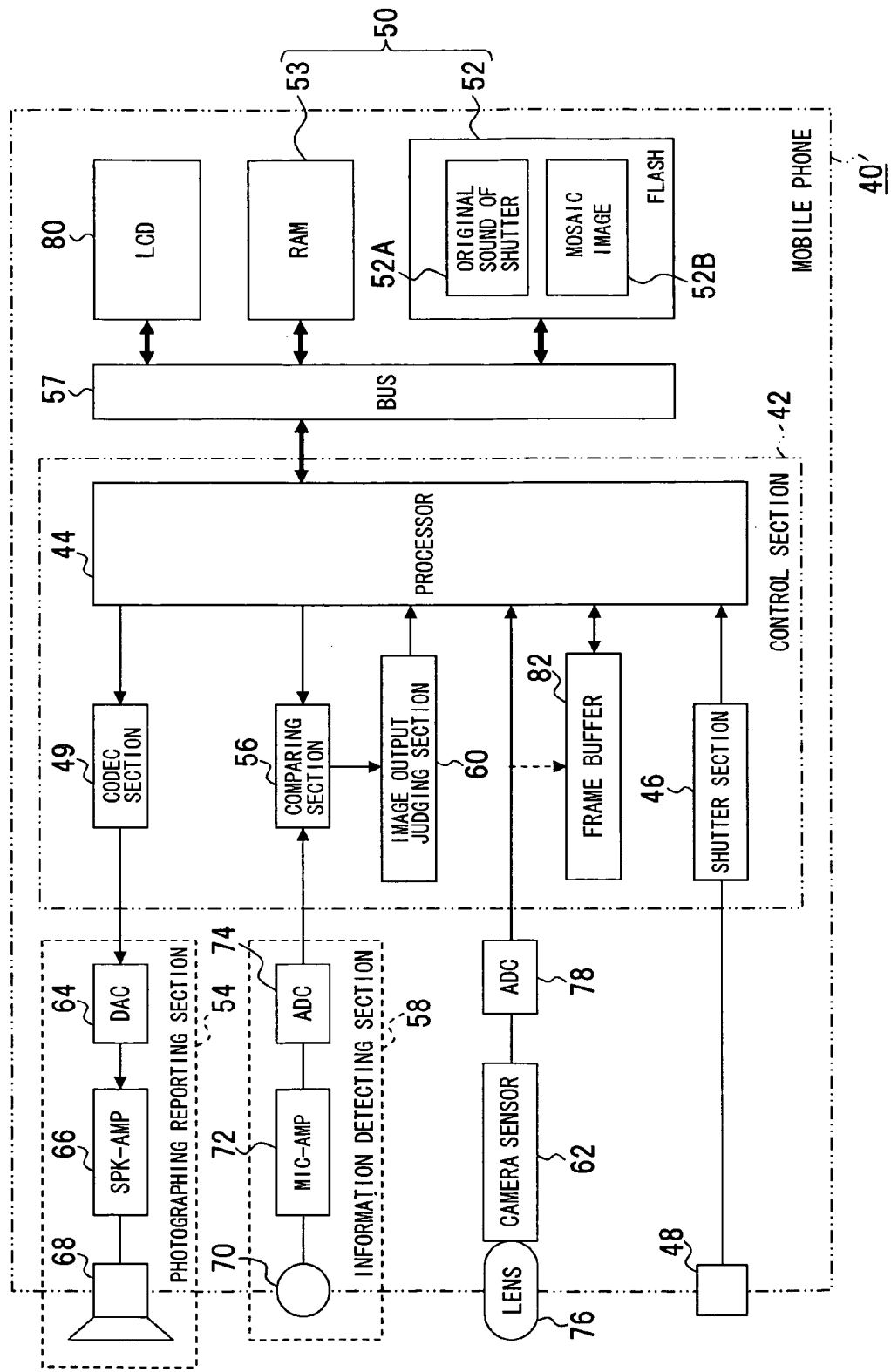
FIG. 14 is a block diagram showing a mobile phone in accordance with a fifth embodiment of the present invention.

FIG. 14 shows a mobile phone in accordance with the fifth embodiment of an electronic device of the present invention. In this mobile phone 40 in accordance with the fifth embodiment, the original sound of shutter is stored in the storage section 52A in the FLASH 52 in the second embodiment (FIG. 7) and a mosaic image is stored in the storage section 52B thereof. The processor 44 in the control section 42, for example, comprises the image processing section that superimposes the above-described mosaic image over the original image corresponding to photographing. Other configurations are the same as the second embodiment, so that the same symbols are added to the same portions and the descriptions are omitted.

Figure 15:
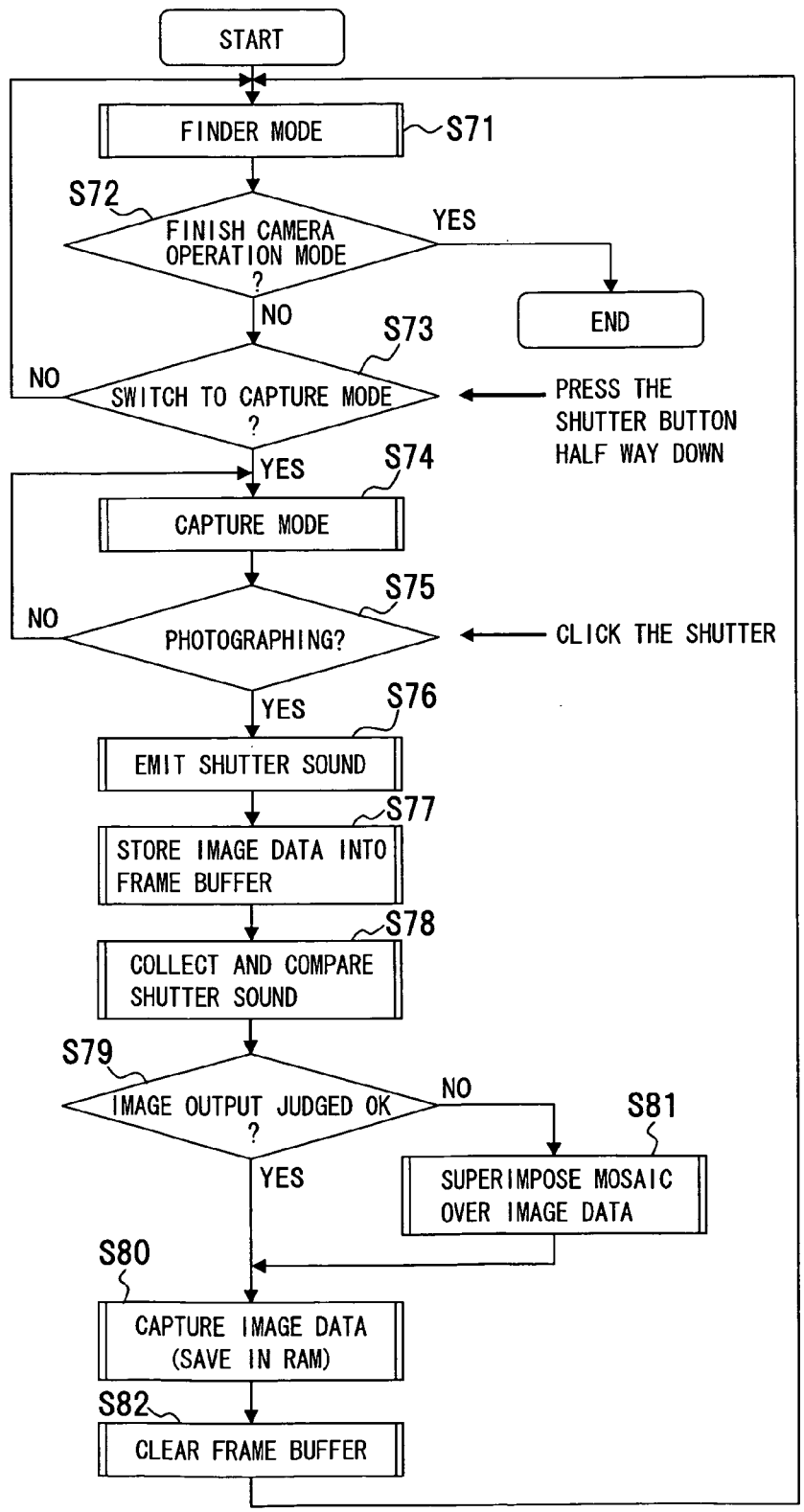
FIG. 15 is a flowchart showing an example of a photographing control method and the program thereof in accordance with a fifth embodiment of the present invention.

Regarding the mobile phone 40 in accordance with this fifth embodiment, the processing operation during photographing is described with reference to FIG. 15. FIG. 15 is a flowchart showing an example of a photographing control method and the program thereof with regard to preventions of spy shots.

Also in this embodiment, switching to the camera operation mode executes the finder mode (step S71), and the image is displayed on the LCD 80. Here, it is judged whether the camera operation mode is maintained or finished (step S72)

Further, if the camera operation mode is maintained, it is judged whether or not the processing is switched to the capture mode (step S73). In this case, pressing the shutter button 48 halfway down switches to the capture mode (step S74). With this state, aborting the shutter button 48 brings back the finder mode (step S71).

It is judged through the capture mode (step S74) whether or not the photographing is permitted (step S75). When the shutter button 48 is pressed all the way down, the shutter operation completes as a photographing action, and the shutter sound is emitted from the speaker 68 in the photographing reporting section 54 (step S76). In this shutter operation, if the button is pressed all the way down with one operation, photographing is performed by passing a state of half way down in its process and by passing the capture mode with the half way down state in its process (step S73 to S76). And the image data is stored temporarily into the frame buffer 82 (step S77).

The shutter sound is collected and detected with the microphone 70 and then compared with the original sound (step S78). That is, the shutter sound is added to the comparing section 56 by having been converted into digital signals, which is then compared with the original sound of shutter read from the storage section 52A in the FLASH 52. Between this shutter sound and the original sound, either frequency component or level, or both of them are compared. Based on this comparison result, at the image output judging section 60, it is judged whether or not the photographing is permitted (step S79). If the comparison result is within a certain range, and if the difference of information between the shutter sound and the original sound is within a certain range, then a judgment of photographing permission is made. If this judgment result permits the photographing, the image data in the frame buffer 82 is subject to storage, and the image data in the frame buffer 82 is saved into the RAM 53 (step 80), and the image data in the frame buffer 82 is deleted when the image data is saved in the RAM 53 (step S82).

Or, if the judgment result prohibits the photographing, the original image data in the frame buffer 82 will be altered by superimposing the mosaic image read from the storage section 52B in the FLASH 52 on the original image (step S81). After storing this altered image into the RAM 53 (step S80), the altered image in the frame buffer 82 is deleted (step S82), and the processing returns to the finder mode (step S71).

Figure 16:
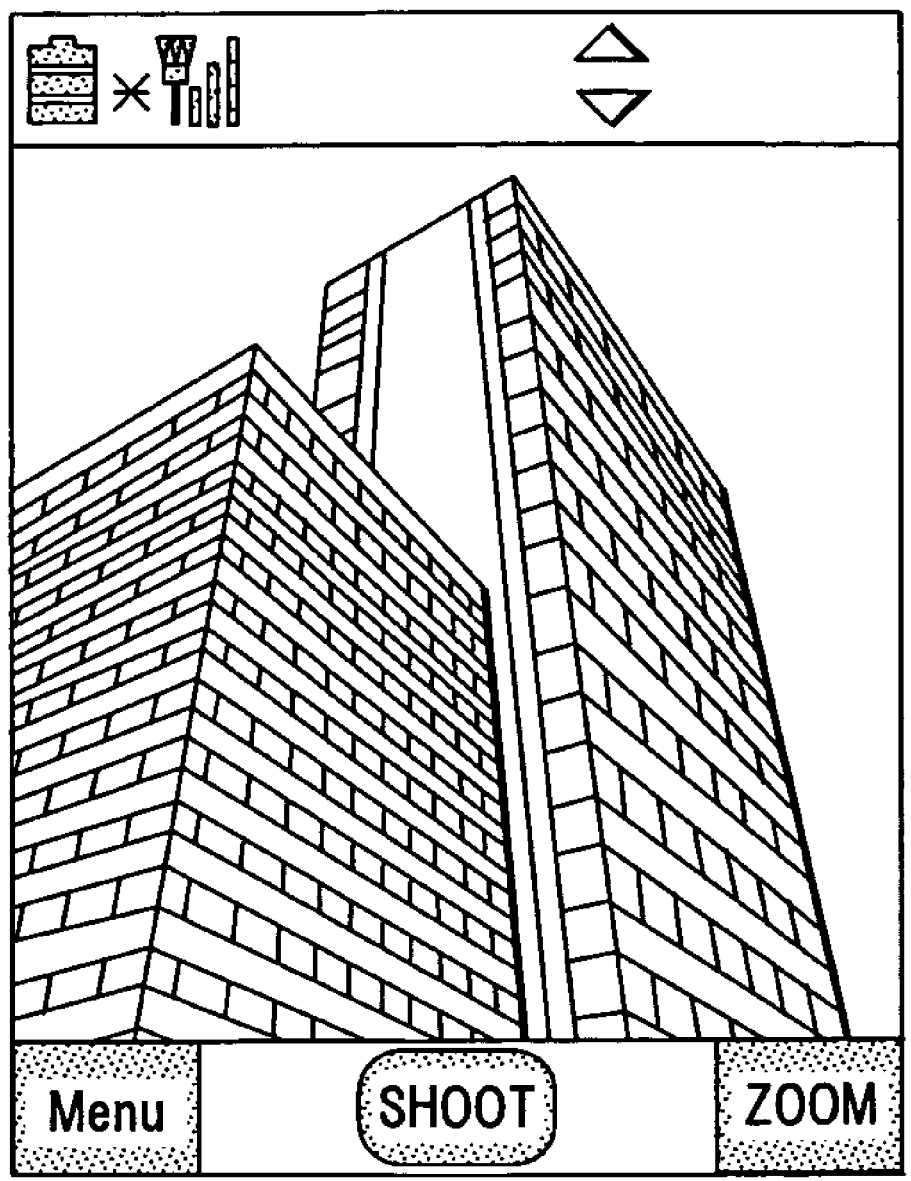
FIG. 16 is a drawing showing an image displayed on a display section.
Figure 17:
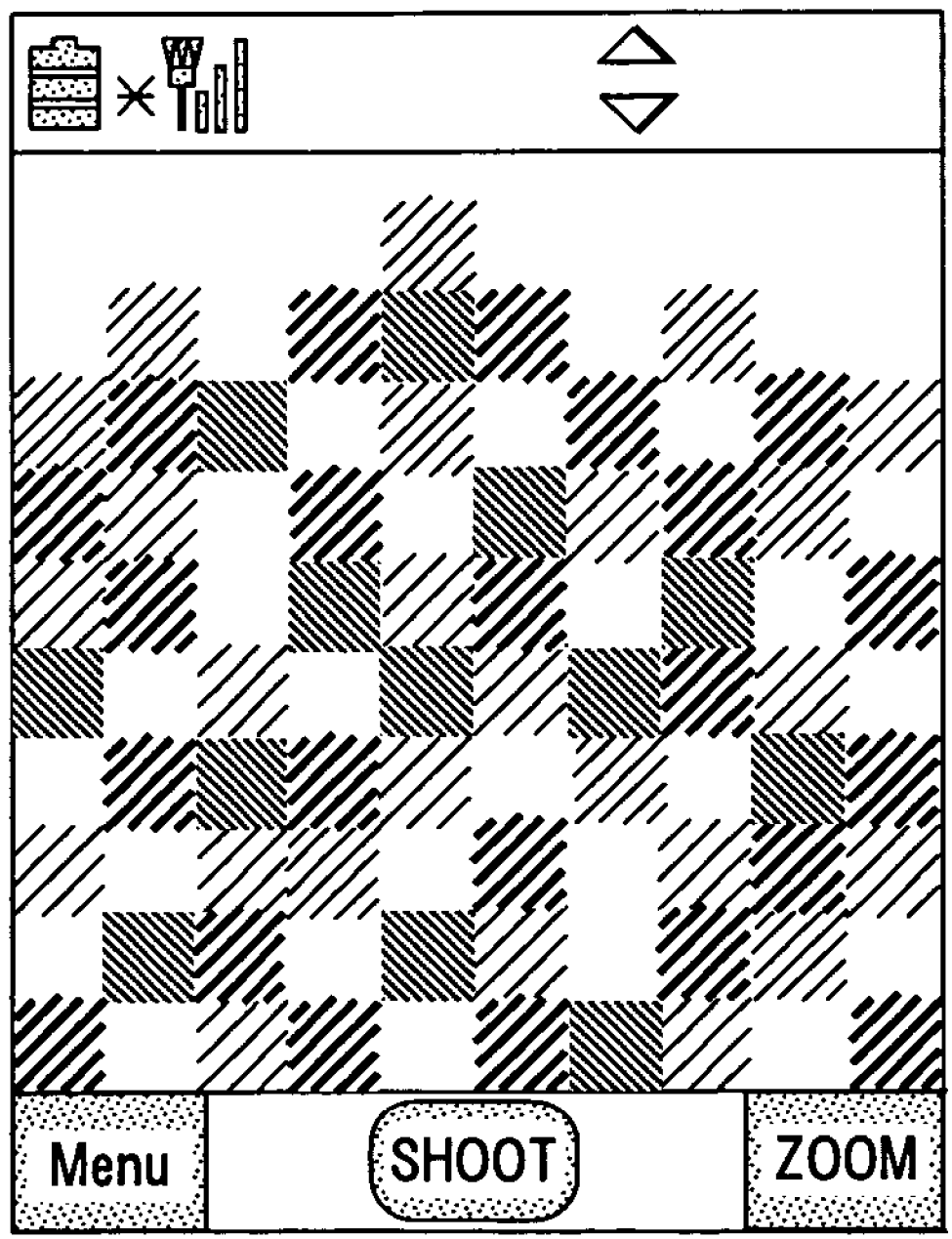
FIG. 17 is a drawing showing a superposed image by mosaic images displayed on a display section.

As has been described hereinabove, while the image stored temporarily into the frame buffer 82 by the shutter operation is saved into the RAM 53 when the photographing is permitted on the basis of the judgment result that uses the shutter sound as the reporting information, otherwise the image is altered without being deleted by such as a superimposing of mosaic images thereon, thereafter saved into the RAM 53 as a storage section, for example. If an image shown in FIG. 16 is used for the original image, for example, then the altered image superimposed by mosaic images will be shown as in FIG. 17. Storing images by such image alterations can enhance the function to prevent inappropriate photographing as well as save the users the inconvenience of misconstruing it as a failure when an image cannot be saved.

In a mobile phone 40 in accordance with this fifth embodiment, a configuration may also be used in which whether or not the photographing is permitted is judged by using light as the reporting information, i.e., a judgment may be made about whether or not the image stored in the frame buffer 82 as the first storage section is saved into the RAM 53.

<Sixth Embodiment>

A sixth embodiment of the present invention is an electronic device with a camera function, having a configuration in which an image is stored temporarily into the first storage section, and then the image is saved into the second storage section if the photographing is permitted, wherein the image having been stored in the first storage section will be altered into a dummy image and saved in the second storage section if it is judged that the photographing is not permitted.

Figure 18:
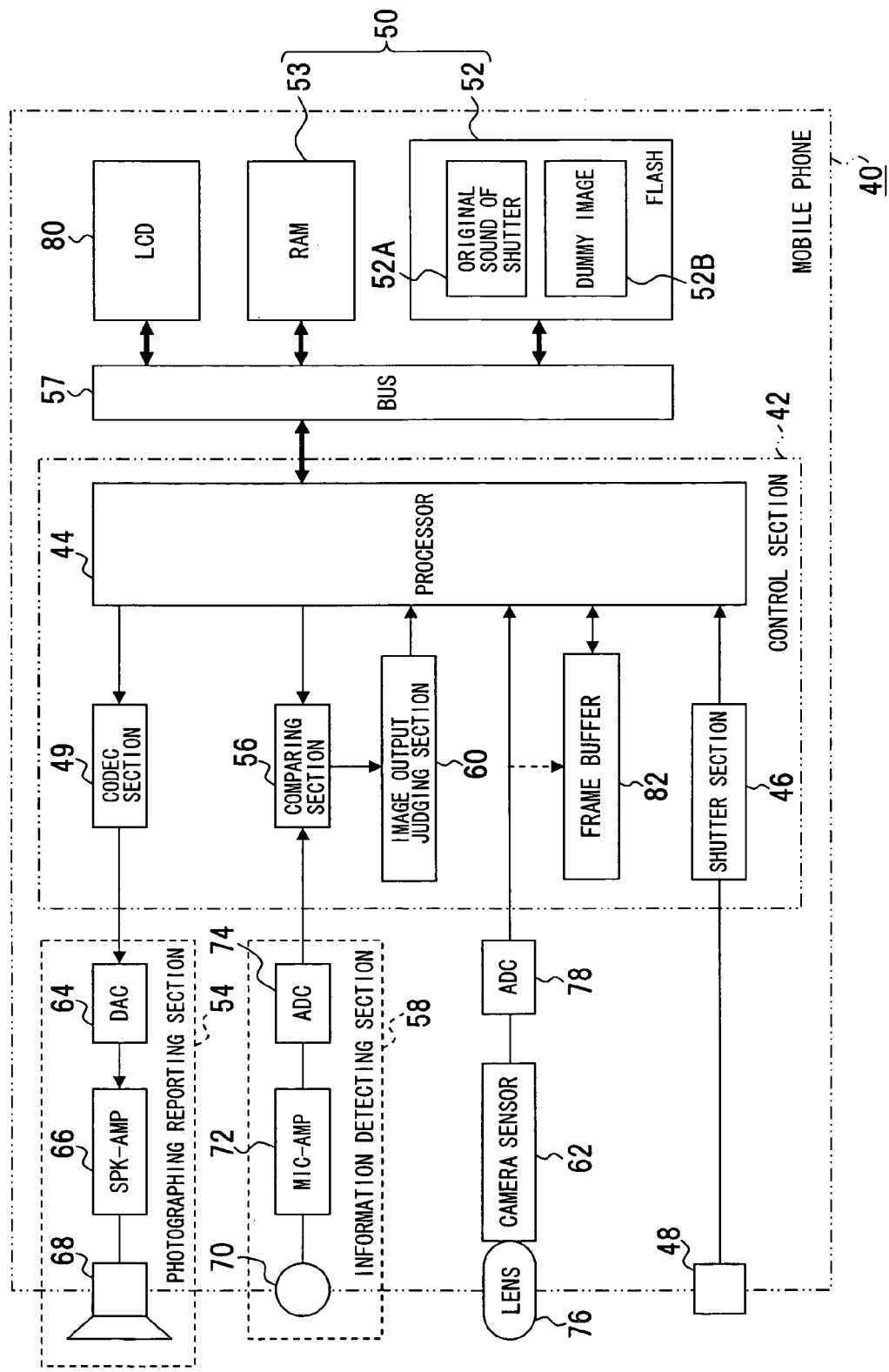
FIG. 18 is a block diagram showing a mobile phone in accordance with a sixth embodiment of the present invention.

FIG. 18 shows a mobile phone in accordance with the sixth embodiment of an electronic device of the present invention. In this mobile phone 40 in accordance with the sixth embodiment, the original sound of shutter is stored in the storage section 52A in the FLASH 52 in the second embodiment (FIG. 7) and a dummy image is stored in the storage section 52B thereof. In this case, an output display of the dummy image to the LCD 80, and the storage processing of the dummy image into the frame buffer 82 and the RAM 53 are executed by the image processing section, and this image processing section is comprised of the processor 44 in the control section 42, for example. Other configurations are the same as the second embodiment, so that the same symbols are added to the same portions and the descriptions are omitted.

Figure 19:
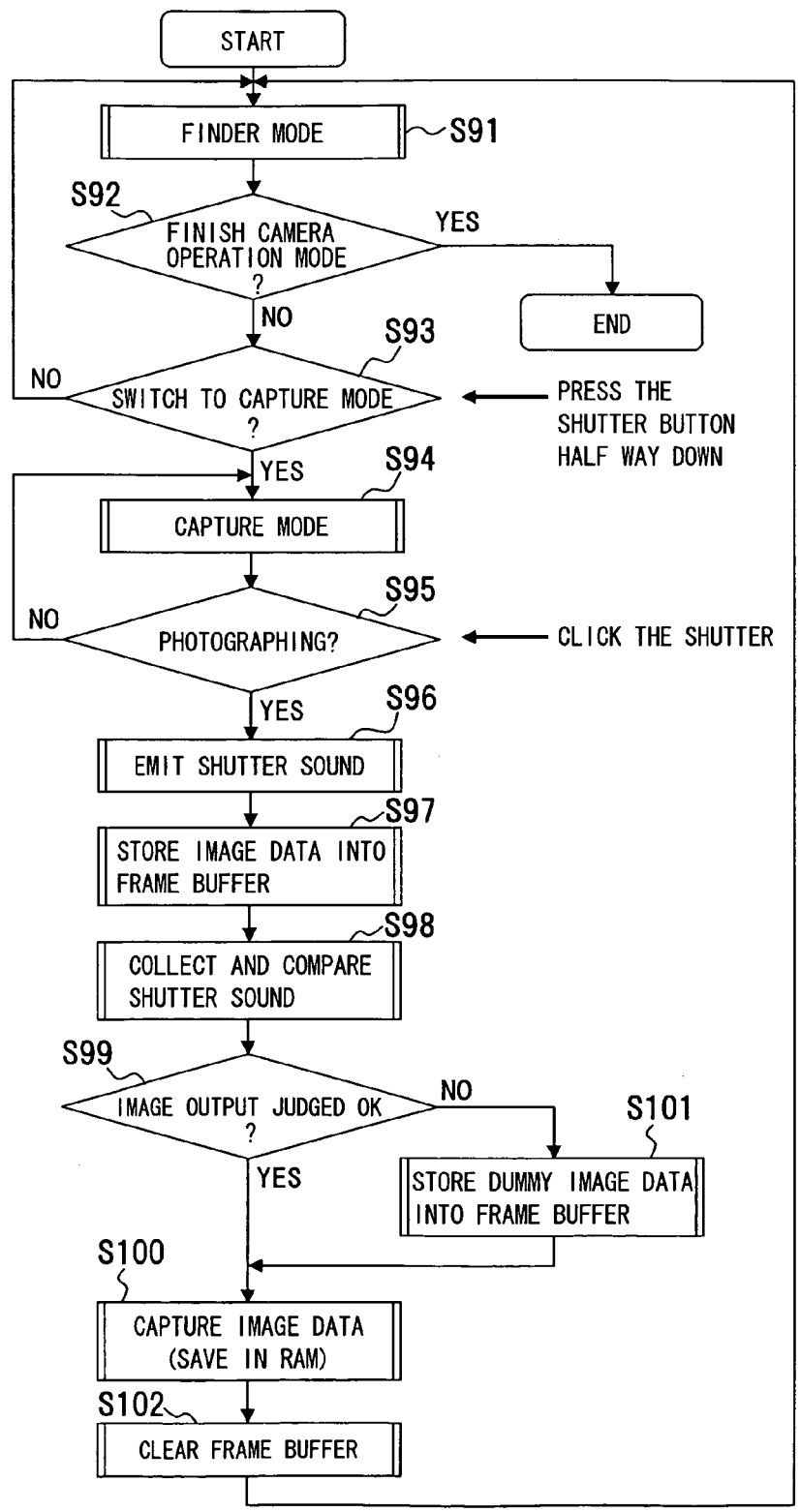
FIG. 19 is a flowchart showing an example of a photographing control method and the program thereof in accordance with a sixth embodiment of the present invention.

Regarding the mobile phone 40 in accordance with this sixth embodiment, the processing operation during photographing is described with reference to FIG. 19. FIG. 19 is a flowchart showing an example of a photographing control method and the program thereof with regard to preventions of spy shots.

Also in this embodiment, switching to the camera operation mode executes the finder mode (step S91), and the image is displayed on the LCD 80. Here, it is judged whether the camera operation mode is maintained or finished (step S92).

Further, if the camera operation mode is maintained, it is judged whether or not the processing is switched to the capture mode (step S93). In this case, pressing the shutter button 48 halfway down switches to the capture mode (step S94). With this state, aborting the shutter button 48 brings back the finder mode (step S91).

It is judged through the capture mode (step S94) whether or not the photographing is permitted (step S95). When the shutter button 48 is pressed all the way down, the shutter operation completes as a photographing action, and the shutter sound is emitted from the speaker 68 in the photographing reporting section 54 (step S96). In this shutter operation, if the button is pressed all the way down with one operation, photographing is performed by passing a state of half way down in its process and by passing the capture mode with the half way down state in its process (step S93 to S96). And the image data is stored temporarily into the frame buffer 82 (step S97).

The shutter sound is collected and detected with the microphone 70 and then compared with the original sound (step S98). That is, the shutter sound is added to the comparing section 56 by having been converted into digital signals, which is then compared with the original sound of shutter read from the FLASH 52. Between this shutter sound and the original sound, either frequency component or level, or both of them are compared. Based on this comparison result, at the image output judging section 60, it is judged whether or not the photographing is permitted (step S99). If the comparison result is within a certain range, and if the difference of information between the shutter sound and the original sound is within a certain range, then a judgment of photographing permission is made. If this judgment result permits the photographing, the image data in the frame buffer 82 is subject to storage, and the image data in the frame buffer 82 is saved into the RAM 53 (step 100), and the image data in the frame buffer 82 is deleted when the image data is saved in the RAM 53 (step S102).

Or, if the judgment result prohibits the photographing, the image in the frame buffer 82 will be either superimposed with the dummy image read from the FLASH 52, or replaced with the dummy image in place of the original image, and then stored into the frame buffer 82 (step S101). After storing this altered image into the RAM 53 (step S100), the altered image in the frame buffer 82 is deleted (step S102), then the processing returns to the finder mode (step S91).

As has been described hereinabove, while the image stored temporarily into the frame buffer 82 by the shutter operation is saved into the RAM 53 when the photographing is permitted on the basis of the judgment result that uses the shutter sound as the reporting information; otherwise the image is deleted and replaced with the dummy image, then saved into the RAM 53 as a storage section, for example. Storing images by such image alterations can enhance the function to prevent inappropriate photographing as well as save the users the inconvenience of misconstruing it as a failure when an image cannot be saved.

In the mobile phone 40 in accordance with this sixth embodiment, a configuration may also be used in which whether or not the photographing is permitted is judged by using light as the reporting information, i.e., a judgment may be made about whether or not the image stored in the frame buffer 82 as the first storage section is saved into the RAM 53.

<Seventh Embodiment>

A seventh embodiment of the present invention is an electronic device with a camera function, having a configuration in which an image is stored temporarily into the first storage section, and then the image is saved into the second storage section if the photographing is permitted, wherein a display informing inappropriate photographing or the like is shown when the photographing is not permitted.

Figure 20:
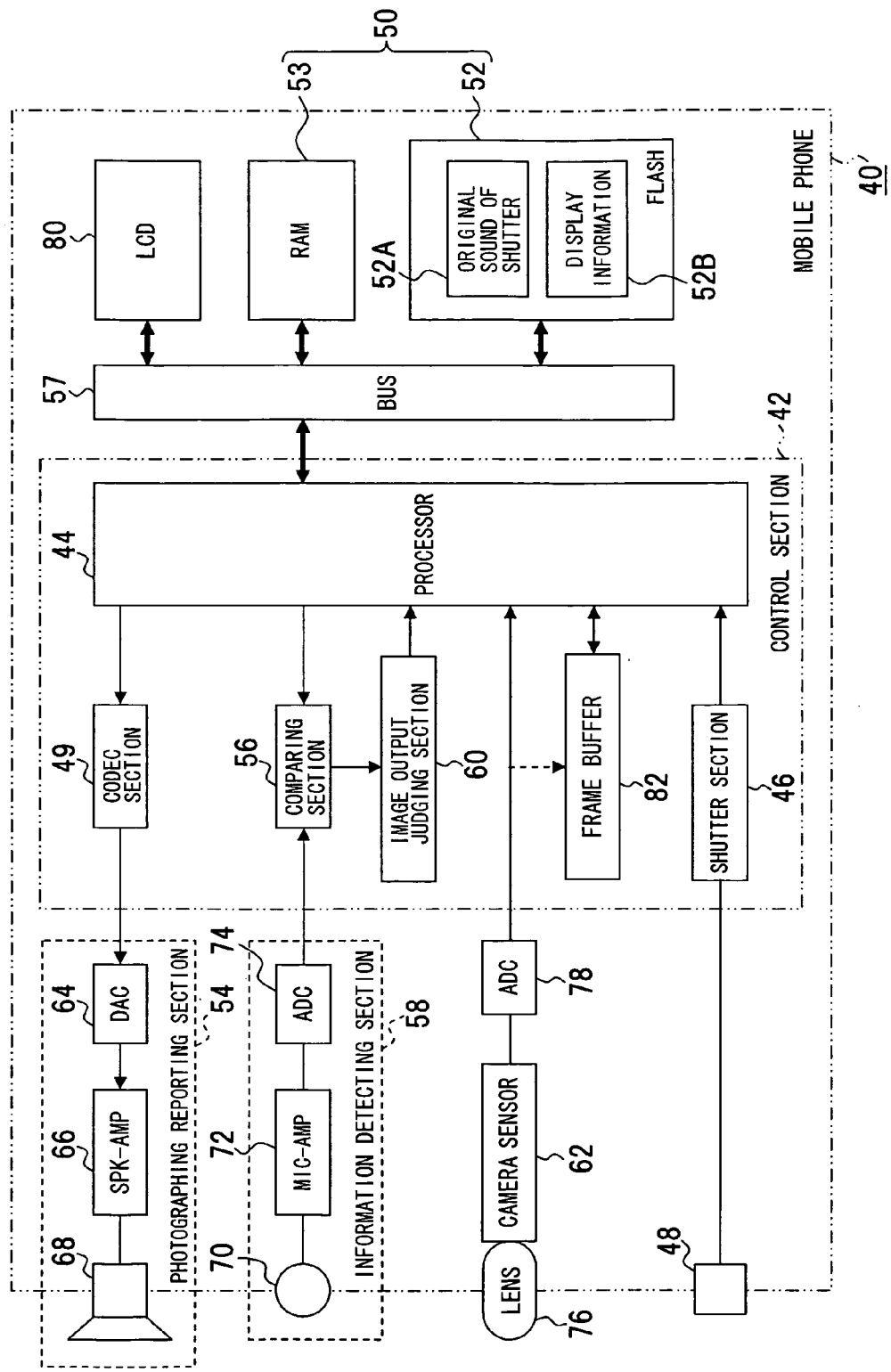
FIG. 20 is a block diagram showing a mobile phone in accordance with a seventh embodiment of the present invention.

FIG. 20 shows a mobile phone in accordance with the seventh embodiment of an electronic device of the present invention. In this mobile phone 40 in accordance with the seventh embodiment, the original sound of shutter is stored in the storage section 52A in the FLASH 52 in the second embodiment (FIG. 7) and the display information is stored in the storage section 52B thereof. Although the display informing inappropriate photographing is presented to the LCD 80, this display processing is executed by the control section 42 as the display processing section. Other configurations are the same as the second embodiment, so that the same symbols are added to the same portions and the descriptions are omitted.

Figure 21:
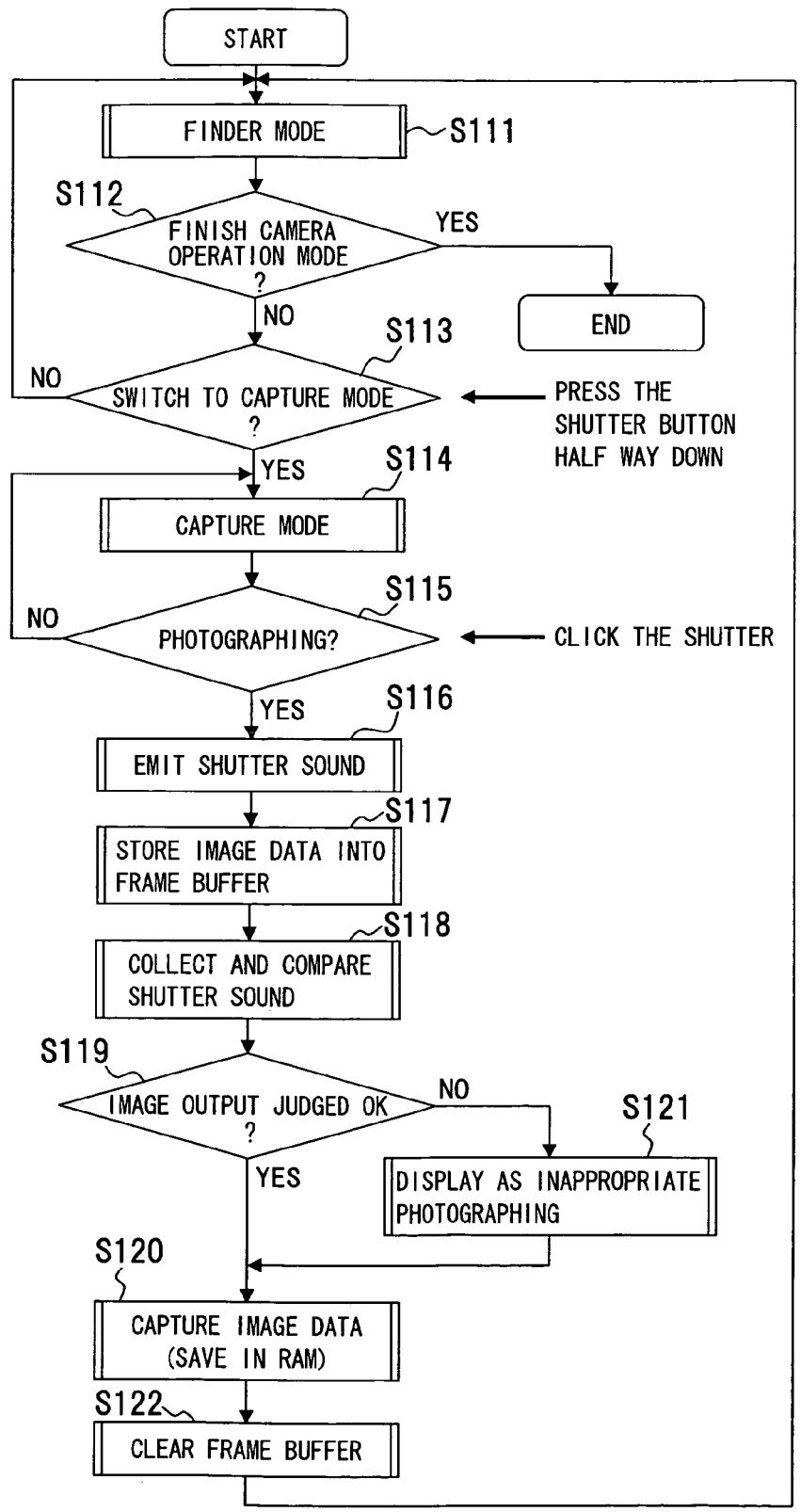
FIG. 21 is a flowchart showing an example of a photographing control method and the program thereof in accordance with a seventh embodiment of the present invention.

Regarding the mobile phone 40 in accordance with this seventh embodiment, the processing operation during photographing is described with reference to FIG. 21. FIG. 21 is a flowchart showing an example of a photographing control method and the program thereof with regard to preventions of spy shots.

Also in this embodiment, switching to the camera operation mode executes the finder mode (step S111), and the image is displayed on the LCD 80. Here, it is judged whether the camera operation mode is maintained or finished (step S112).

Further, if the camera operation mode is maintained, it is judged whether or not the operation is switched to the capture mode (step S113). In this case, pressing the shutter button 48 halfway down switches to the capture mode (step S114) With this state, aborting the shutter button 48 brings back the finder mode (step S111).

It is judged through the capture mode (step S114) whether or not the photographing is permitted (step S115). When the shutter button 48 is pressed all the way down, the shutter operation completes as a photographing action, and the shutter sound is emitted from the speaker 68 in the photographing reporting section 54 (step S116). In this shutter operation, if the button is pressed all the way down with one operation, photographing is performed by passing a state of half way down in its process and by passing the capture mode with the half way down state in its process (step S113 to S116). And the image data is stored temporarily into the frame buffer 82 (step S117).

The shutter sound is collected and detected with the microphone 70 and then compared with the original sound (step S118). That is, the shutter sound is added to the comparing section 56 by having been converted into digital signals, which is then compared with the original sound of shutter read from the FLASH 52. Between this shutter sound and the original sound, either frequency component or level, or both of them are compared. Based on this comparison result, at the image output judging section 60, it is judged whether or not the photographing is permitted (step S119). If the comparison result is within a certain range, and if the difference of information between the shutter sound and the original sound is within a certain range, then a judgment of photographing permission is made. If this judgment result permits the photographing, the image data in the frame buffer 82 is subject to storage, and the image data in the frame buffer 82 is saved into the RAM 53 (step 120).

Figure 22:
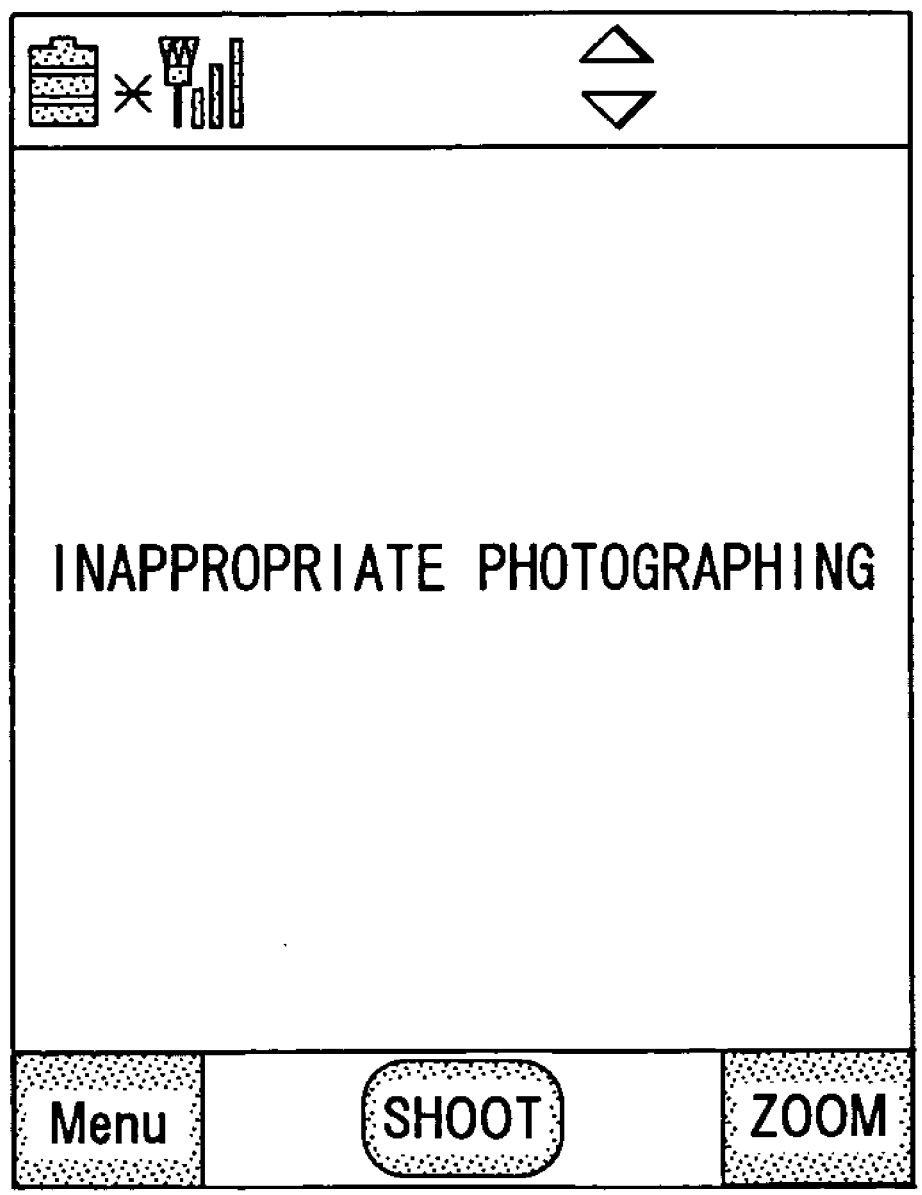
FIG. 22 is a drawing showing a message of inappropriate photographing displayed on a display section.

Or, if the judgment result prohibits the photographing, a display informing inappropriate photographing is shown on the LCD 80 by the display information read from the FLASH 52 (step S121). As to this display of inappropriate photographing, as shown in FIG. 22, messages such as "Inappropriate photographing" and "Photographing is not permitted" are displayed on the LCD 80.

Moreover, when the image data is saved into the RAM 53 from the frame buffer 82 (step S120), the image in the frame buffer 82 is deleted (step S122) and the processing returns to the finder mode (step S111). Also, when the judgment result prohibits the photographing and the message informing inappropriate photographing is displayed on the LCD 80 (step S121), the image in the frame buffer 82 is deleted (step S122) and the processing returns to the finder mode (step S111).

As has been described hereinabove, while the image stored temporarily into the frame buffer 82 by the shutter operation is saved into the RAM 53 when the photographing is permitted on the basis of the judgment result that uses the shutter sound as the reporting information, otherwise the image is deleted as well as the message informing inappropriate photographing is displayed, so that the function to prevent inappropriate photographing can be enhanced.

In the mobile phone in accordance with this seventh embodiment, a configuration may also be used in which whether or not the photographing is permitted is judged by using light as the reporting information, i.e., a judgment may be made about whether or not the image stored in the frame buffer 82 as the first storage section is saved into the RAM 53.

<Eighth Embodiment>

An eighth embodiment of the present invention is an electronic device with a camera function, having a configuration in which an image is stored temporarily into the first storage section, and then the image is saved into the second storage section if the photographing is permitted, wherein a voice message informing inappropriate photographing is outputted when the photographing is prohibited.

Figure 23:
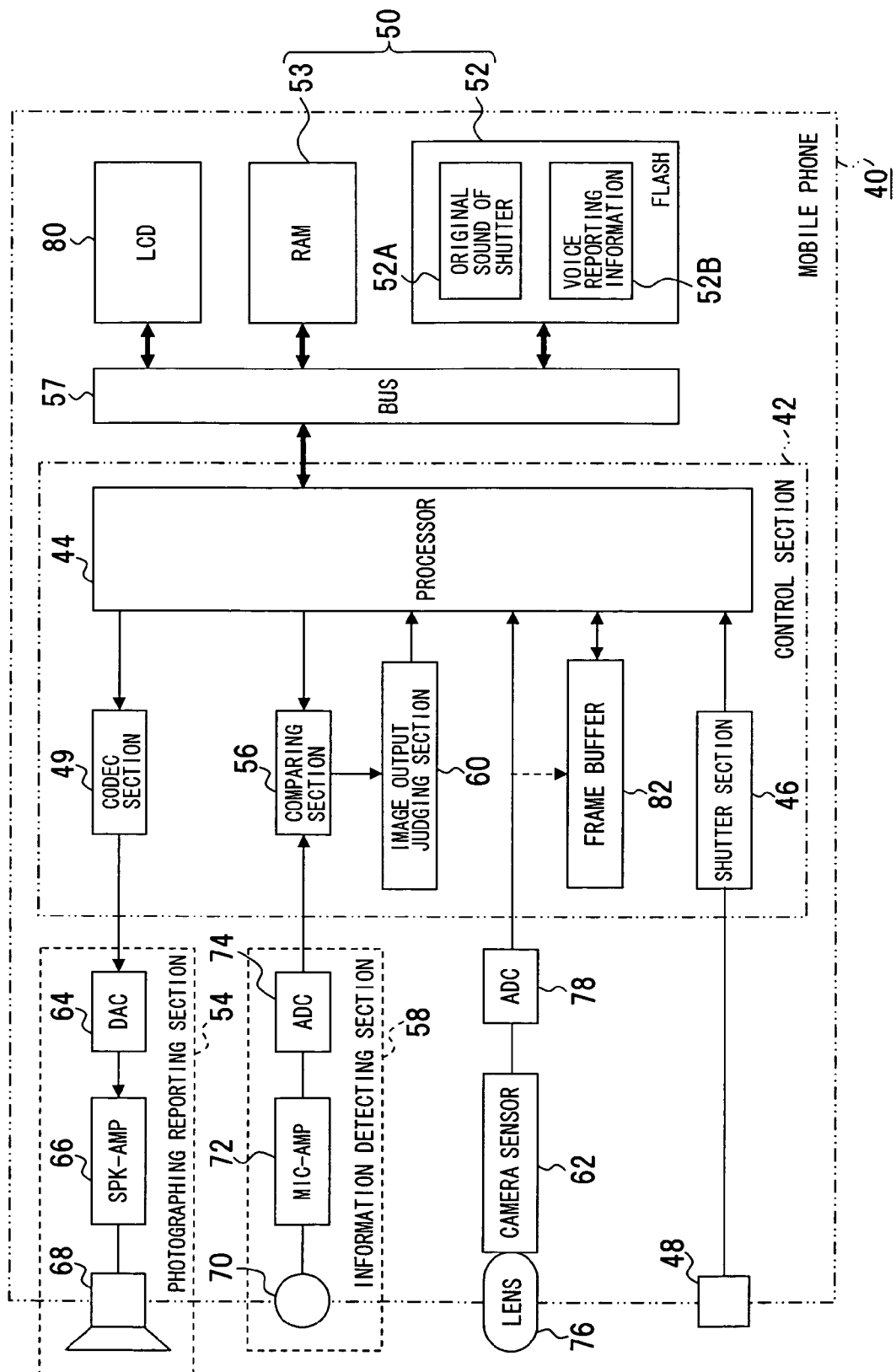
FIG. 23 is a block diagram showing a mobile phone in accordance with an eighth embodiment of the present invention.

FIG. 23 shows a mobile phone in accordance with the eighth embodiment of an electronic device of the present invention. In this mobile phone 40 in accordance with this eighth embodiment, the original sound of shutter is stored in the storage section 52A in the FLASH 52 in the second embodiment (FIG. 7) and the voice reporting information is stored in the storage section 52B thereof. Other configurations are the same as the second embodiment, so that the same symbols are added to the same portions and the descriptions are omitted.

Figure 24:
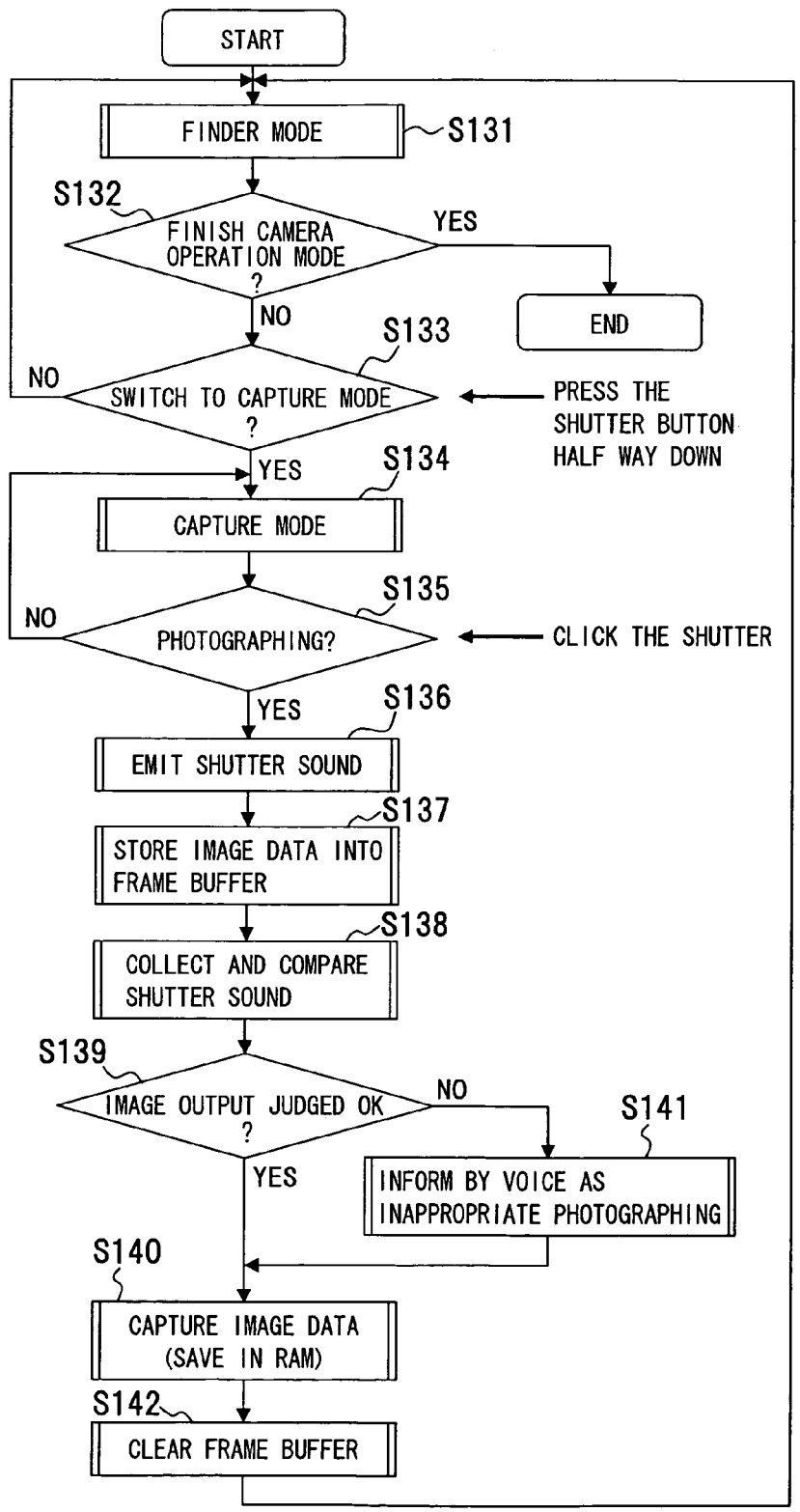
FIG. 24 is a flowchart showing an example of a photographing control method and the program thereof in accordance with an eighth embodiment of the present invention.

Regarding the mobile phone in accordance with this eighth embodiment, the processing operation during photographing is described with reference to FIG. 24. FIG. 24 is a flowchart showing an example of a photographing control method and the program thereof with regard to preventions of spy shots.

Also in this embodiment, switching to the camera operation mode executes the finder mode (step S131), and the image is displayed on the LCD 80. Here, it is judged whether the camera operation mode is maintained or finished (step S132).

Further, if the camera operation mode is maintained, it is judged whether or not the operation is switched to the capture mode (step S133). In this case, pressing the shutter button 48 halfway down switches to the capture mode (step S134) With this state, aborting the shutter button 48 brings back the finder mode (step S131).

It is judged through the capture mode (step S134) whether or not the photographing is permitted (step S135). When the shutter button 48 is pressed all the way down, the shutter operation completes as a photographing action, and the shutter sound is emitted from the speaker 68 in the photographing reporting section 54 (step S136). In this shutter operation, if the button is pressed all the way down with one operation, photographing is performed by passing a state of half way down in its process and by passing the capture mode with the half way down state in its process (step S133 to S136). And the image data is stored temporarily into the frame buffer 82 (step S137).

The shutter sound is collected and detected with the microphone 70 and then compared with the original sound (step S138). That is, the shutter sound is added to the comparing section 56 by having been converted into digital signals, which is then compared with the original sound of shutter read from the FLASH 52. Between this shutter sound and the original sound, either frequency component or level, or both of them are compared. Based on this comparison result, at the image output judging section 60, it is judged whether or not the photographing is permitted (step S139). If the comparison result is within a certain range, and if the difference of information between the shutter sound and the original sound is within a certain range, then a judgment of photographing permission is made. If this judgment result permits the photographing, the image data in the frame buffer 82 is subject to storage, and the image data in the frame buffer 82 is saved into the RAM 53 (step 140), followed by the deletion of the image data in the frame buffer 82 (step S142), then the processing returns to the finder mode (step S131).

Or, if the judgment result prohibits the photographing, the voice reporting information read from the FLASH 52 is added to the photographing reporting section 54, and the voice message informing inappropriate photographing is outputted from the speaker 68 (step S141), followed by the deletion of the image data in the frame buffer 82 (step S142), then the processing returns to the finder mode (step S131).

As has been described hereinabove, while the image stored temporarily into the frame buffer 82 by the shutter operation is saved into the RAM 53 when the photographing is permitted on the basis of the judgment result that uses the shutter sound as the reporting information, otherwise the image is deleted as well as the voice message informing inappropriate photographing is outputted, so that the function to prevent inappropriate photographing can be enhanced.

In the mobile phone in accordance with this eighth embodiment, a configuration may also be used in which whether or not the photographing is permitted is judged by using light as the reporting information, i.e., a judgment may be made about whether or not the image stored in the frame buffer 82 as the first storage section is saved into the RAM 53.

<Ninth Embodiment>

A ninth embodiment of the present invention is an electronic device with a camera function, having a configuration in which an image is stored temporarily into the first storage section, and then the image is saved into the second storage section if the photographing is permitted, wherein messages informing such as photographing permission or image storing are outputted in the case where the photographing is permitted.

Figure 25:
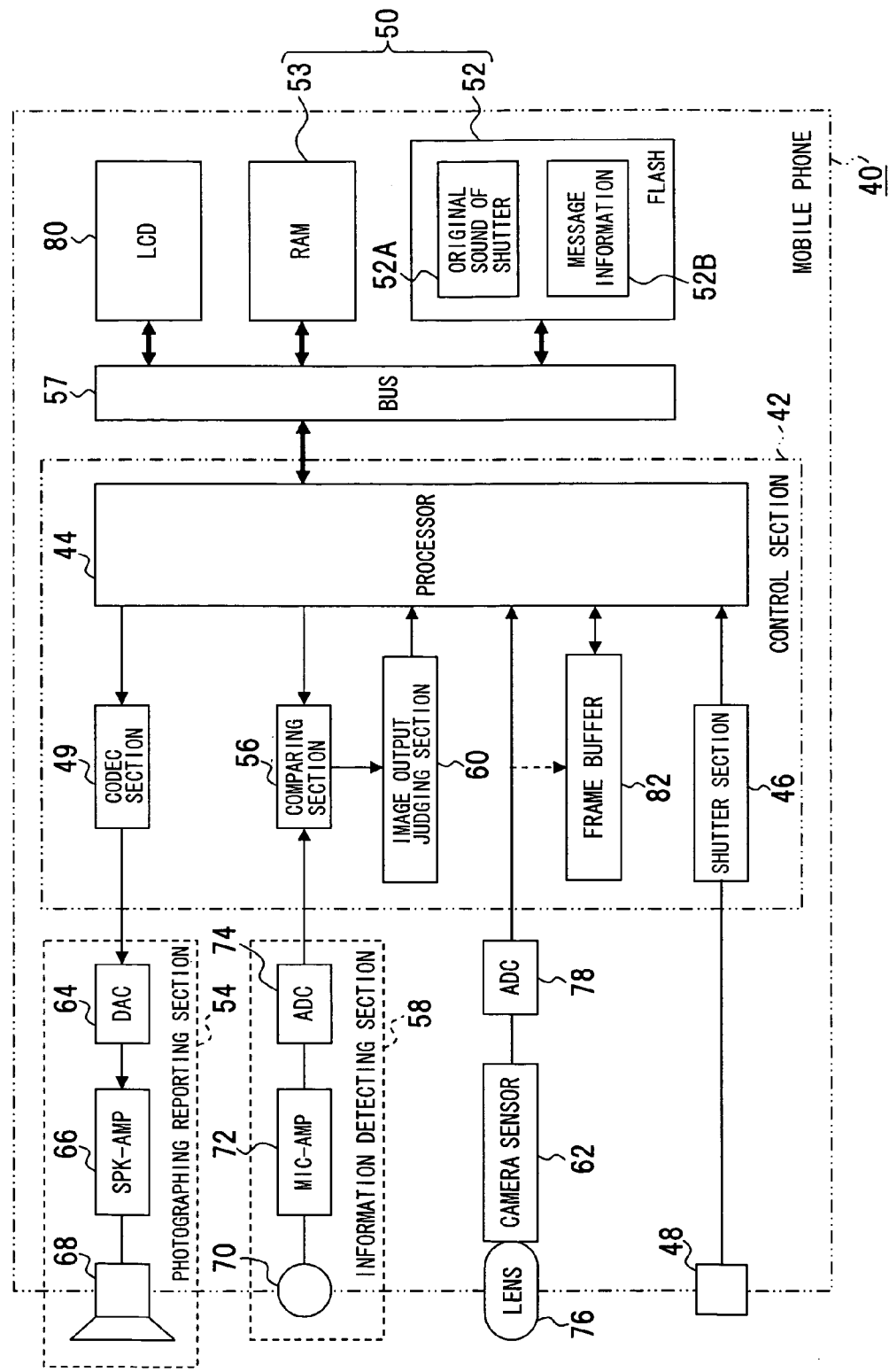
FIG. 25 is a block diagram showing a mobile phone in accordance with a ninth embodiment of the present invention.

FIG. 25 shows a mobile phone in accordance with the ninth embodiment of an electronic device of the present invention. In this mobile phone 40 in accordance with this ninth embodiment, the original sound of shutter is stored in the storage section 52A in the FLASH 52 in the second embodiment (FIG. 7) and the message information is stored in the storage section 52B thereof. In this case, the message information is a voice message or a melody informing photographing permission or image storing. Other configurations are the same as the second embodiment, so that the same symbols are added to the same portions and the descriptions are omitted.

Figure 26:
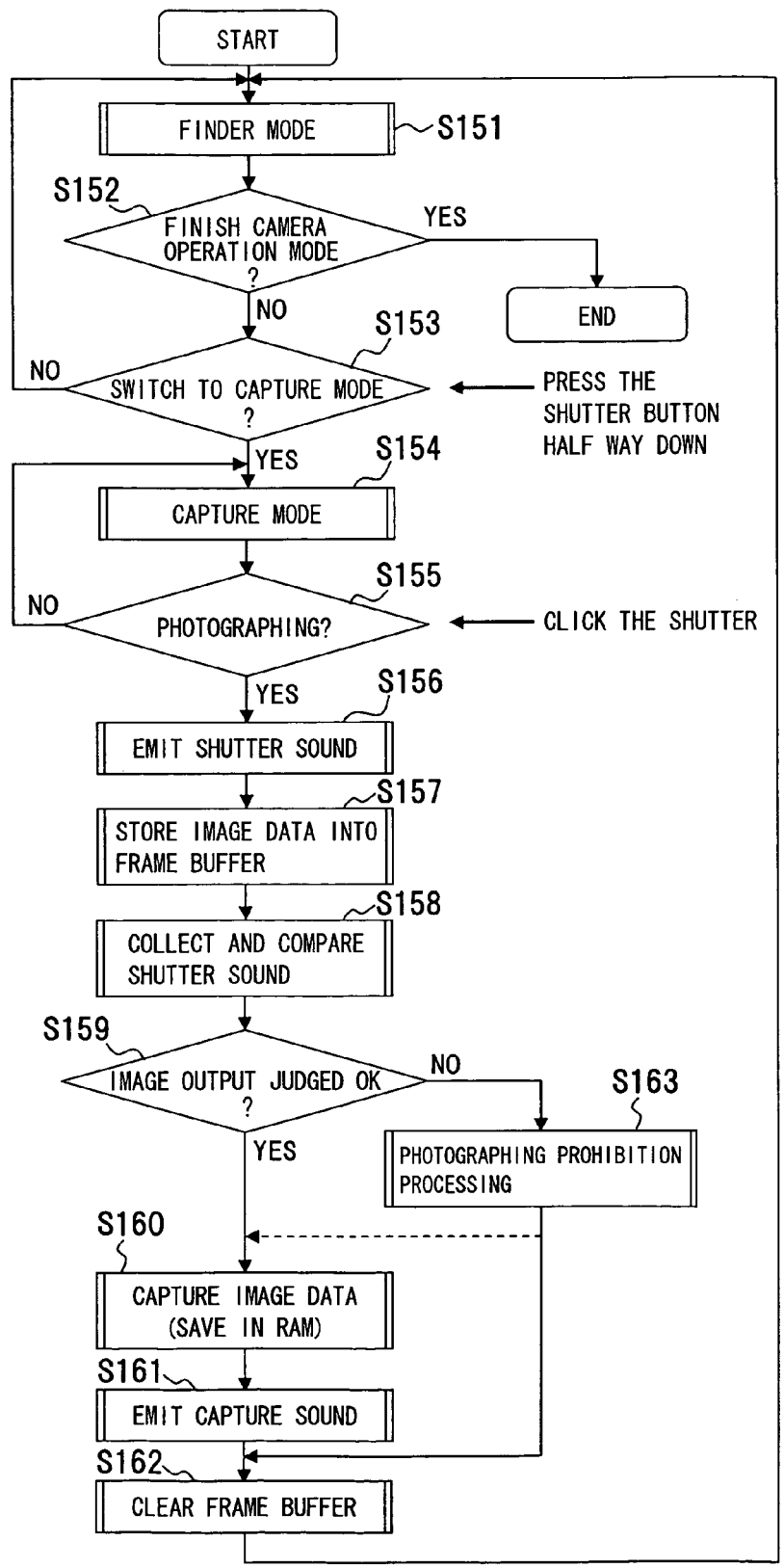
FIG. 26 is a flowchart showing an example of a photographing control method and the program thereof in accordance with a ninth embodiment of the present invention.

Regarding the mobile phone 40 in accordance with this ninth embodiment, the processing operation during photographing is described with reference to FIG. 26. FIG. 26 is a flowchart showing an example of a photographing control method and the program thereof with regard to preventions of spy shots.

Also in this embodiment, switching to the camera operation mode executes the finder mode (step S151), and the image is displayed on the LCD 80. Here, it is judged whether the camera operation mode is maintained or finished (step S152).

Further, if the camera operation mode is maintained, it is judged whether or not the operation is switched to the capture mode (step S153). In this case, pressing the shutter button 48 halfway down switches to the capture mode (step S154). With this state, aborting the shutter button 48 brings back the finder mode (step S151).

It is judged through the capture mode (step S154) whether or not the photographing is permitted (step S155). When the shutter button 48 is pressed all the way down, the shutter operation completes as a photographing action, and the shutter sound is emitted from the speaker 68 in the photographing reporting section 54 (step S156). In this shutter operation, if the button is pressed all the way down with one operation, photographing is performed by passing a state of half way down in its process and by passing the capture mode with the half way down state in its process (step S153 to S156). And the image data is stored temporarily into the frame buffer 82 (step S157).

The shutter sound is collected and detected with the microphone 70 and then compared with the original sound (step S158). That is, the shutter sound is added to the comparing section 56 by having been converted into digital signals, which is then compared with the original sound of shutter read from the FLASH 52. Between this shutter sound and the original sound, either frequency component or level, or both of them are compared. Based on this comparison result, at the image output judging section 60, it is judged whether or not the photographing is permitted (step S159). If the comparison result is within a certain range, and if the difference of information between the shutter sound and the original sound is within a certain range, then a judgment of photographing permission is made. If this judgment result permits the photographing, the image data in the frame buffer 82 is subject to storage, and the image data in the frame buffer 82 is saved into the RAM 53 (step S160).

When the image is saved into the RAM 53, the message information read from the FLASH 52 is outputted to the photographing reporting section 54, and the voice or melody informing the image storing is outputted from the speaker 68 (step S161), followed by the deletion of the image in the frame buffer 82 (step S162), then the processing returns to the finder mode (step S151).

Or, if the photographing is prohibited (step S159) the photographing prohibition processing is executed (step S163). As to such photographing prohibition processing, for example, any one of, or two and more processing selected out of the following processing: superimposing of the mosaic image over the original image in the frame buffer 82 (fifth embodiment); storing the dummy image in place of the original image in the frame buffer 82 (sixth embodiment); display of inappropriate photographing (seventh embodiment); and voice reporting (eighth embodiment) are executed, followed by the deletion of the image stored in the frame buffer 82 (step S162) then the processing returns to the finder mode (step S151).

As has been described hereinabove, while the image stored temporarily into the frame buffer 82 by the shutter operation is saved into the RAM 53 when the photographing is permitted on the basis of the judgment result that uses the shutter sound as the reporting information; otherwise the image is deleted as well as the message is outputted informing its storage in the case where the image is saved, so that the function to prevent inappropriate photographing can be enhanced.

<Tenth Embodiment>

A tenth embodiment of the present invention is an electronic device with a camera function, having a configuration in which the reporting information such as a photographing report or a request for photographing permission is transmitted wirelessly to an opposite electronic device; a notifying information representing permission/prohibition of photographing is received; and whether or not the photographing is permitted is judged by using the notifying information received at the receiving section. Moreover, an electronic device disposed at the opposite side of this electronic device presents the reporting information to an information presenting section by receiving the reporting information at a receiving section.

Figure 27:
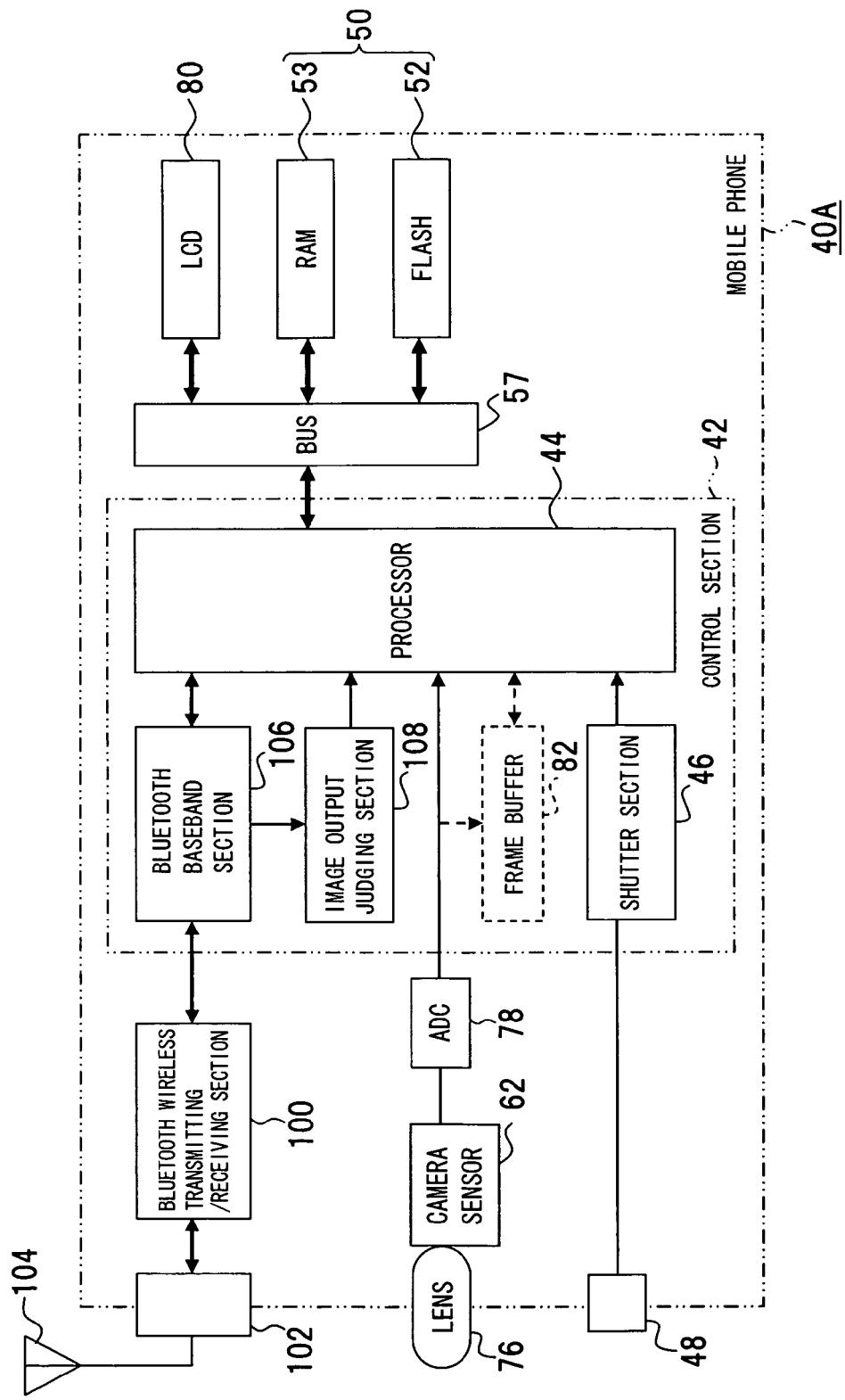
FIG. 27 is a block diagram showing a mobile phone in accordance with a tenth embodiment of the present invention.

FIG. 27 shows a mobile phone in accordance with the tenth embodiment of the present invention. In the mobile phone 40A in accordance with this tenth embodiment, a Bluetooth wireless transmitting/receiving section 100 configures a transmitting section that transmits either the reporting information representing the photographing or the reporting information requesting photographing permission wirelessly as well as a receiving section that receives the notifying information such as photographing permission notifications wirelessly, and the reporting signals are transmitted/received by performing the processing of carrier modulation by signals representing the reporting information and demodulation of the received signals into the notifying information, or the like. Bluetooth is a wireless communication standard in short-range, which has realized data communication function wirelessly, and uses the wireless media such as electric waves, ultrasonic waves, sound waves, and light for the transmission media. Transmitting/receiving of electric waves is performed via an antenna 104 connected to an input/output part 102. A Bluetooth baseband section 106 is disposed in the control section 42, and the processing of the reporting information to be transmitted and the notifying information demodulated is performed by the signal processing at Bluetooth in this Bluetooth baseband section 106. A piece of reporting information such as the information representing the photographing or the information requesting photographing permission is added as the transmission information from the processor 44 to the Bluetooth wireless transmitting/receiving section 100, and a piece of notifying information representing the photographing permission/prohibition is extracted as the received information from the Bluetooth wireless transmitting/receiving section 100. Further, an image output judging section 108, for example, is disposed in the control section 42 as a means for judging the photographing permission/prohibition, and the output from the Bluetooth baseband section 106 is added to this image output judging section 108. At the image output judging section 108, by using the notifying information representing the photographing permission/prohibition, for example, a judgment of the image output is made as the photographing permission/prohibition judgment, and the judgment output is added to the processor 44. In this embodiment, the judgment output at the image output judging section 108 decides the image output permission/prohibition; however, the judgment output may also decide the photographing permission/prohibition. Other configurations are the same as the first embodiment (FIG. 3) so that the same symbols are added to the same portions and the descriptions are omitted. In this case, the configurations described in the first to the ninth embodiments may be used together in the mobile phone 40A.

Figure 28:
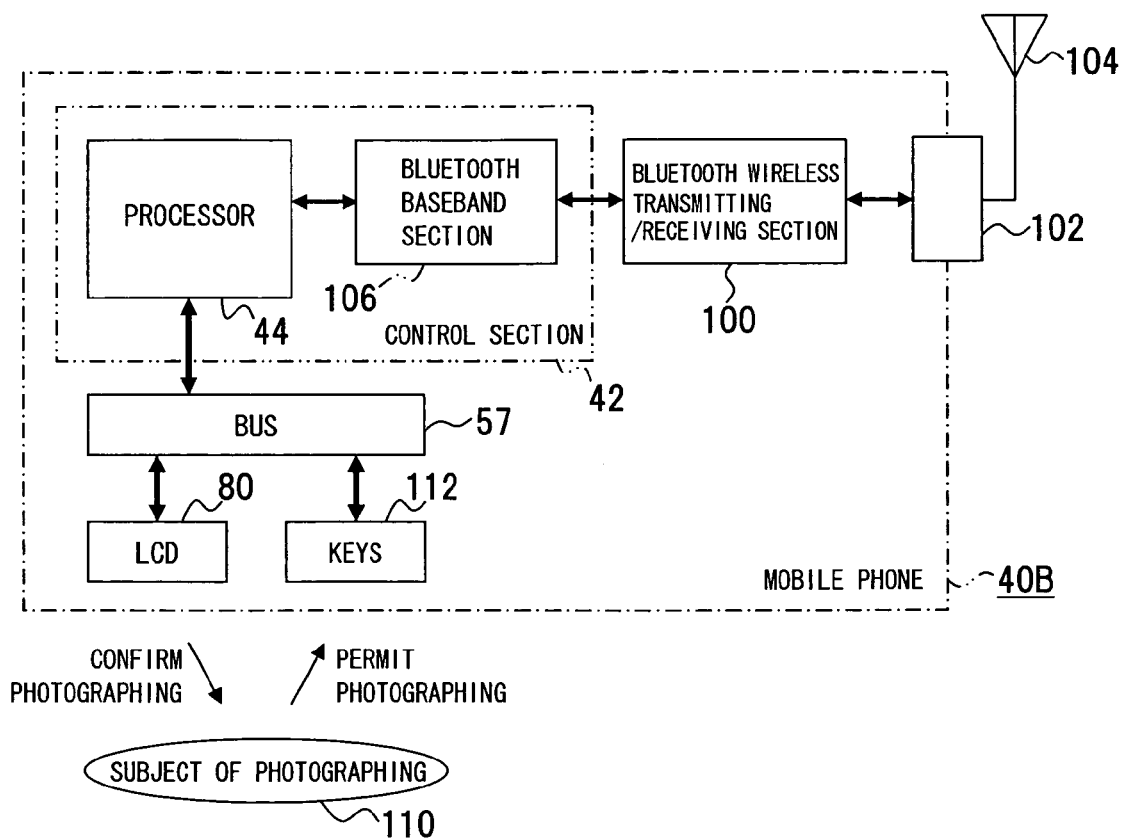
FIG. 28 is a block diagram showing an opposite mobile phone in accordance with a tenth embodiment of the present invention.

In addition, FIG. 28 shows a mobile phone 40B disposed at the opposite side to the mobile phone 40A in accordance with the tenth embodiment of the present invention. This mobile phone 40B is provided with a similar Bluetooth wireless transmitting/receiving section 100 to the mobile phone 40A on the opposite side, an input/output part 102, an antenna 104, a bus 57, and an LCD 80, and includes a Bluetooth baseband section 106 and a processor 44 in the control section 42. In this case, the LCD 80 and a speaker that is not shown (for example, the speaker 68 shown in FIG. 3) configure the information presenting section that presents the notifying information to the subject of photographing 110. The notifying information representing the photographing permission/prohibition issued by the subject of photographing 100 who has recognized the message representing the reporting information is added to the processor 44 via the keys 112.

Figure 29:
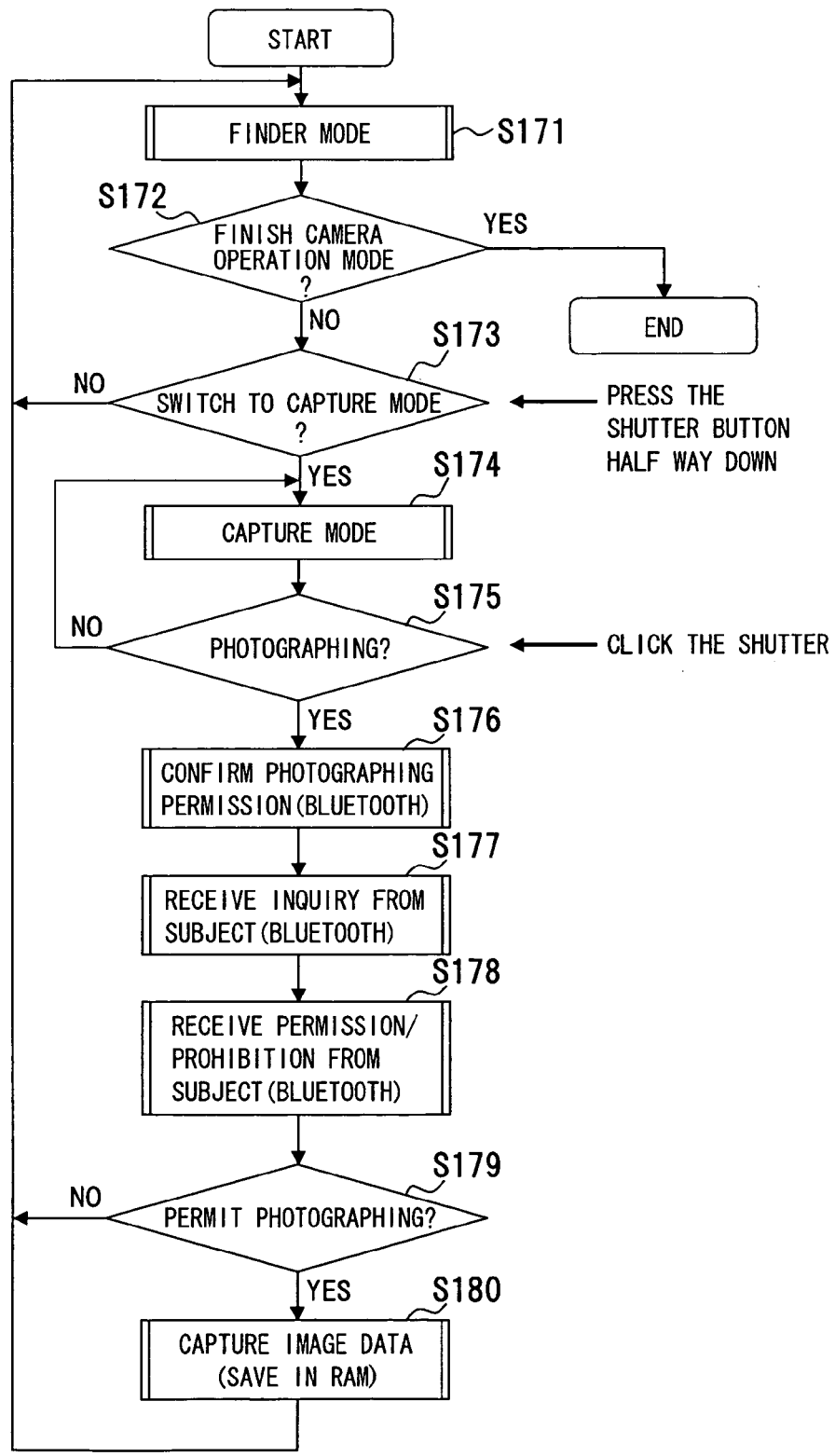
FIG. 29 is a flowchart showing an example of a photographing control method and the program thereof in accordance with a tenth embodiment of the present invention.

Regarding the mobile phones 40A, 40B in accordance with this tenth embodiment, the processing operation during photographing is described with reference to FIG. 29. FIG. 29 is a flowchart showing an example of a photographing control method and the program thereof with regard to preventions of spy shots.

Also in this embodiment, switching to the camera operation mode executes the finder mode (step S171), and the image is displayed on the LCD 80. Here, it is judged whether the camera operation mode is maintained or finished (step S172).

Further, if the camera operation mode is maintained, it is judged whether or not the operation is switched to the capture mode (step S173). In this case, pressing the shutter button 48 halfway down switches to the capture mode (step S174) With this state, aborting the shutter button 48 brings back the finder mode (step S171).

It is judged through the capture mode (step S174) whether or not the photographing is permitted (step S175). When the shutter button 48 is pressed all the way down, photographing is started. In this shutter operation, if the button is pressed all the way down with one operation, the photographing processing is performed by passing a state of half way down in its process and by passing the capture mode with the half way down state in its process (step S173 to S176) At this time the verification processing of photographing permission is performed (step S176), i.e., the reporting information such as the information representing photographing or the information requesting photographing permission is outputted from the processor 44 at the mobile phone 40A side (FIG. 27), and then transferred from the antenna 104 via both the Bluetooth baseband section 106 and the Bluetooth wireless transmitting/receiving section 100. The mobile phone 40B on the opposite side (FIG. 28) receives the inquiry of photographing (step S177) and decodes the received signal into the reporting information via both the Bluetooth wireless transmitting/receiving section 100 and the Bluetooth baseband section 106, and then adds the reporting information to the processor 44. By this reporting information, the information representing photographing or the information requesting photographing permission is presented to the LCD 80 of the mobile phone 40B, so that the subject of photographing 110 can verify the information.

The notifying information representing whether or not the photographing is permitted is issued using the keys 112 or the like from the subject of photographing 110 who has received this reporting information, and this notifying information is transmitted from the mobile phone 40B to the mobile phone 40A via the control section 42 and the Bluetooth wireless transmitting/receiving section 100.

The mobile phone 40A receives the notifying information representing whether or not the photographing is permitted (step S178), and a judgment is made whether or not the photographing is permitted based on this notifying information (step S179). In this case, as the notifying information representing whether or not the photographing is permitted, in addition to such active responses as the photographing permission/prohibition information, there may be cases where no response is made, and if that is the case, the photographing is prohibited, for example, from the viewpoint of protecting the subject of photographing 110. In such cases where the photographing is prohibited, the processing returns to the finder mode (step S171), and when the photographing is permitted, the image data is subject to storage and saved into the RAM 53 (step S180). In such cases where the photographing is prohibited, in the same way as the aforementioned fifth or seventh embodiment, the processing may switch to the finder mode (step 171), after having altered the original image in the frame buffer 82 by superimposing mosaic images thereon or displaying inappropriate photographing or the like and having deleted the image stored in the frame buffer 82.

In this case, when the image is saved into the RAM 53, by providing the photographing reporting section 54 in the same way as the ninth embodiment (FIG. 25), the processing may return to the finder mode (step S171), after having issued the message information read from the FLASH 52 to the photographing reporting section 54, then having issued the vocal reporting informing storing of the image from the speaker 68 using voice or melody, and having deleted the image in the frame buffer 82.

Further, the message may be presented to the speaker or to the LCD 80 of the mobile phone 40A, based on the notifying information representing the photographing permission/prohibition from the mobile phone 40B.

As has been described hereinabove, the function to prevent inappropriate photographing can be enhanced by inquiring about photographing wirelessly for the opposite mobile phone 40B; receiving the notifying information representing the photographing permission/prohibition at the mobile phone 40A side; judging whether or not the photographing is permitted based on the notifying information; and deciding whether or not the photographing is permitted and whether or not the image is saved.

In the mobile phone according to this tenth embodiment, a judgment may be made about whether or not the photographing is permitted by using light for the reporting information and about whether or not the image stored in the frame buffer 82 as the first storage section is saved into the RAM 53 as the second embodiment.

<Eleventh Embodiment>

Figure 30:
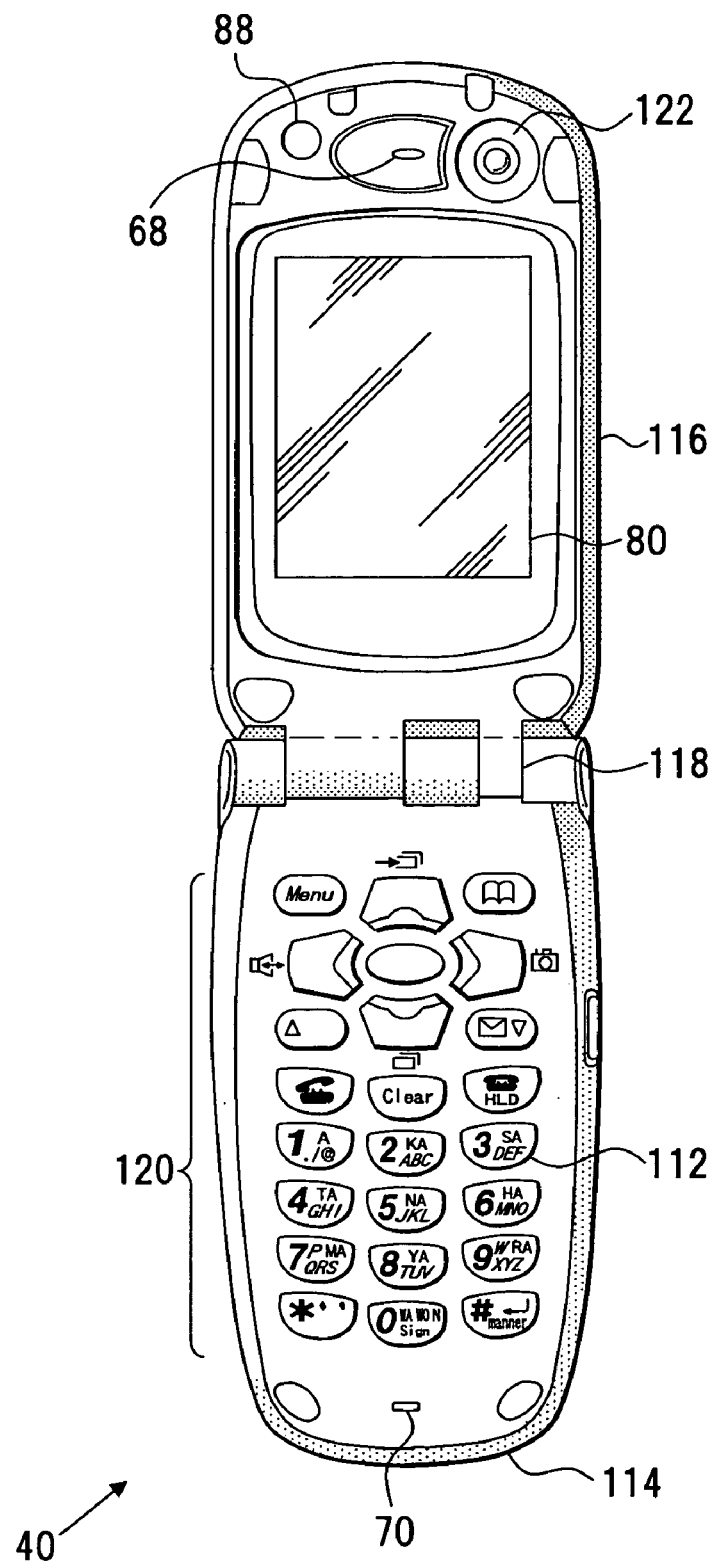
FIG. 30 is a front view of a mobile phone in accordance with an eleventh embodiment of the present invention.
Figure 31:
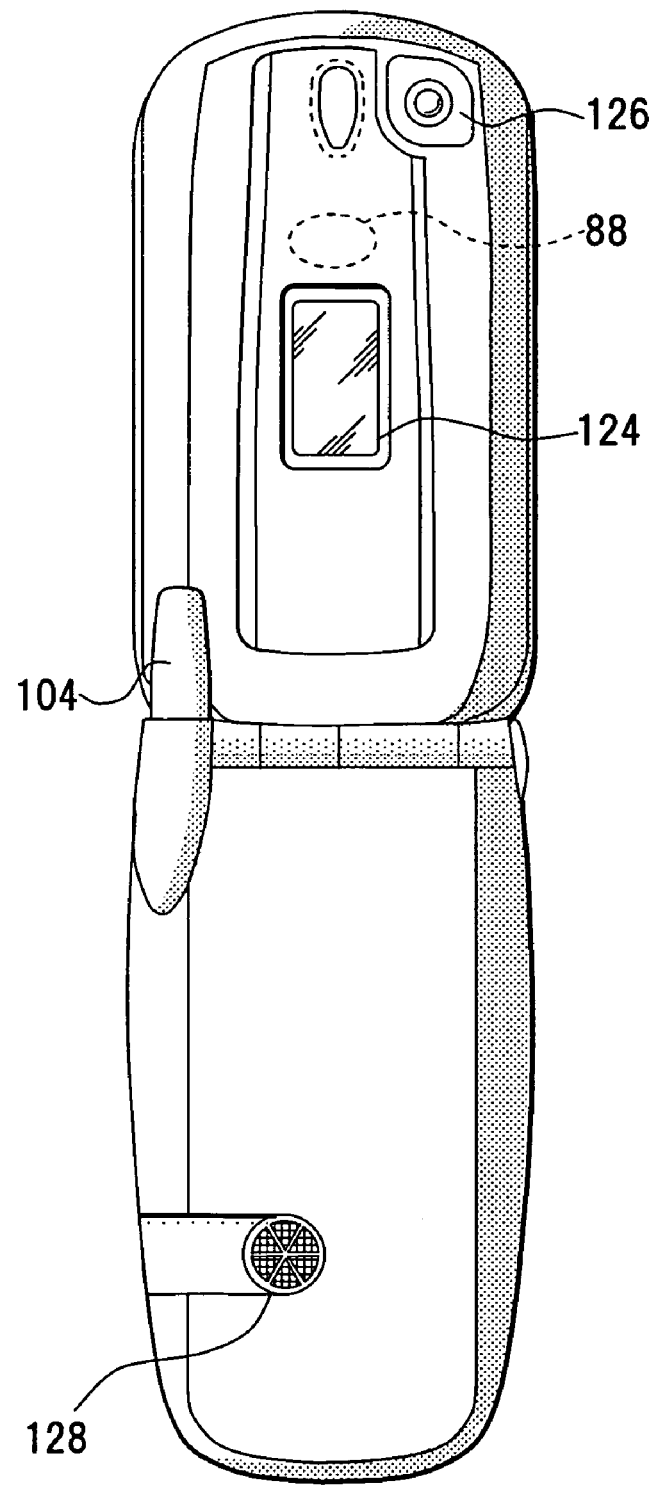
FIG. 31 is a rear view of the mobile phone shown in FIG. 30.

Regarding an electronic device in accordance with an eleventh embodiment, a folding-type mobile phone 40 shown in FIG. 30 and FIG. 31 may be configured. FIG. 30 shows an opened state of the mobile phone 40 and FIG. 31 shows the rear view of the mobile phone 40.

In this mobile phone 40, a main body part 114 and a cover part 116 are made to be openable and closable via a hinge part 118, and the main body part 114 comprises an input operation part 120 including a plurality of keys 112 or the like and a microphone 70, and houses the control section 42, the photographing reporting section 54, the information detecting section 58, the camera sensor 62, the RAM 53, and other phone function sections as well, which were already described in each embodiment. In the cover part 116, a speaker 68, an LCD 80 that is a first display section as the information presenting section, and a first camera 122 are disposed together with a photo sensor 88. In the rear part, an LCD 124 that is a second display section as the information presenting section are disposed, together with a second camera 126. Also a second speaker 128 is disposed in the rear part of the main body part 114.

According to such a configuration, since this mobile phone 40, as has been described in each embodiment, has the virtue of; receiving the light or the shutter sound that is the reporting information issued at the time of photographing; judging whether or not the photographing is permitted and whether or not the image is saved by using this reporting information; enabling the photographing and the image storing based on the judgment, it is difficult to disable the function to prevent inappropriate photographing through modifications such as cutting the wire of the speaker 68, accordingly the prevention of inappropriate photographing such as spy shots can be enhanced.

In addition, in this embodiment, for example, the light emitted from the LCD 124 on the rear side may be detected at the photo sensor 88 to be used for judgment of the photographing permission/prohibition. That is, using not only the shutter sound or the flash light of photographing, but also the light and the sound that are emitted from the mobile phone 40 during its regular operations for reporting information for judgment of the photographing permission/prohibition, serves as an impetus for malicious people to refrain from committing inappropriate photographing such as spy shots, accordingly the function to prevent inappropriate photographing can be enhanced.

<Twelfth Embodiment>

Figure 32:
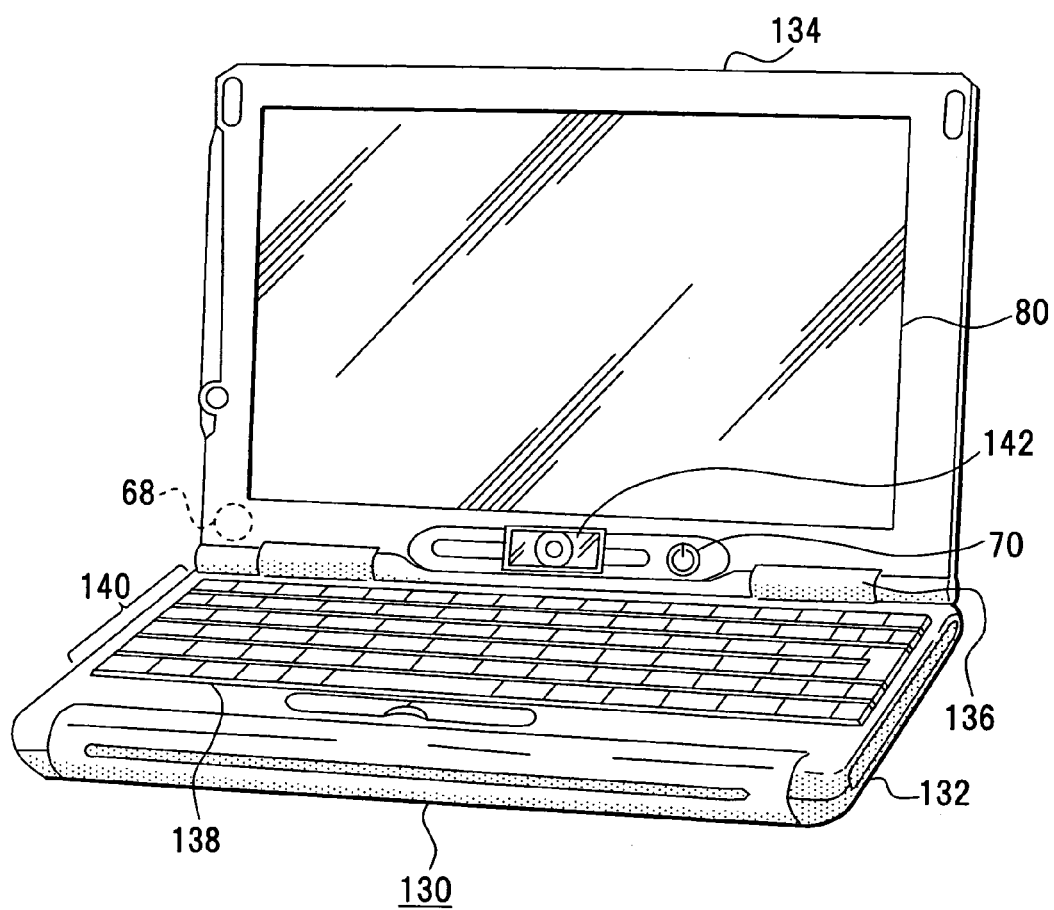
FIG. 32 is a perspective view of a notebook personal computer in accordance with a twelfth embodiment of the present invention.

Regarding an electronic device in accordance with a twelfth embodiment, for example, an information-processing device such as a notebook personal computer as shown in FIG. 32, may be configured. FIG. 32 shows a perspective view of a notebook personal computer 130.

In this notebook personal computer 130, a main body part 132 and a cover part 134 are made to be openable and closable via a hinge part 136, and the main body part 132 comprises an input operation part 140 including a plurality of keys 138 or the like, a microphone 70, a speaker 68, and a camera 142 as well. In such a notebook personal computer 130, by disposing the photographing reporting section 54, the information detecting section 58, the control section 42 and the like, which were described in each embodiment, and by executing similar processing, inappropriate photographing such as spy shots can be prevented as well as the function to prevent them can be enhanced.

<Thirteenth Embodiment>

Figure 33:
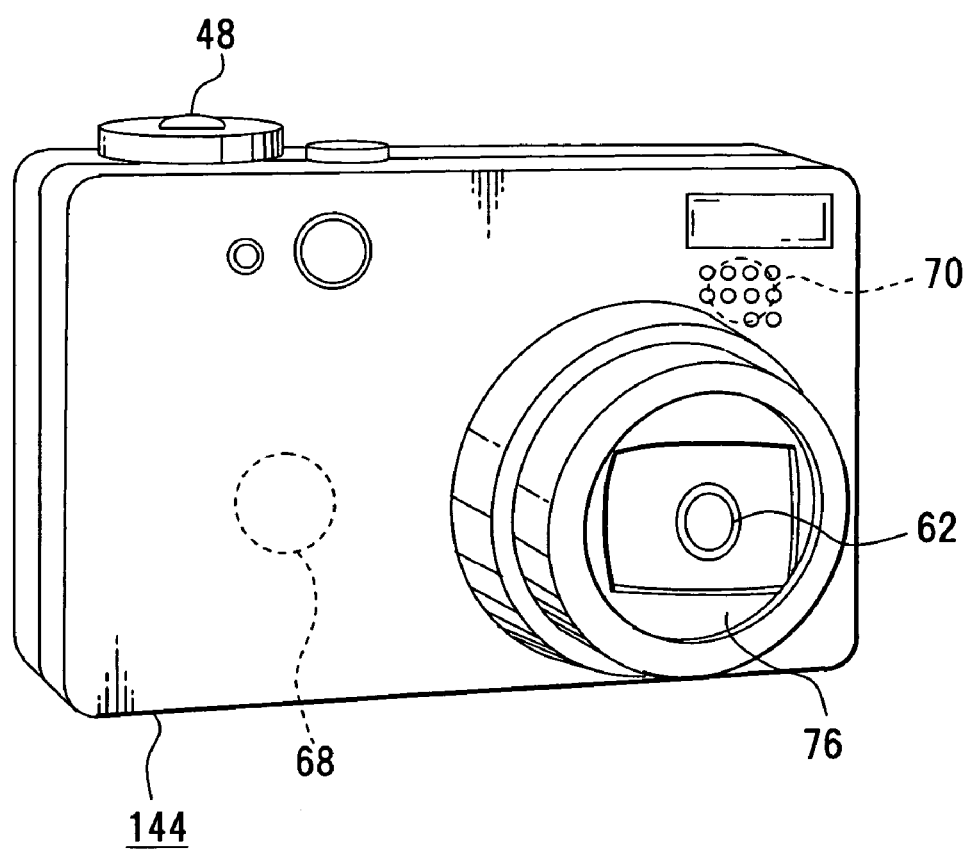
FIG. 33 is a perspective view of a digital camera seen from the front side in accordance with a thirteenth embodiment of the present invention.
Figure 34:
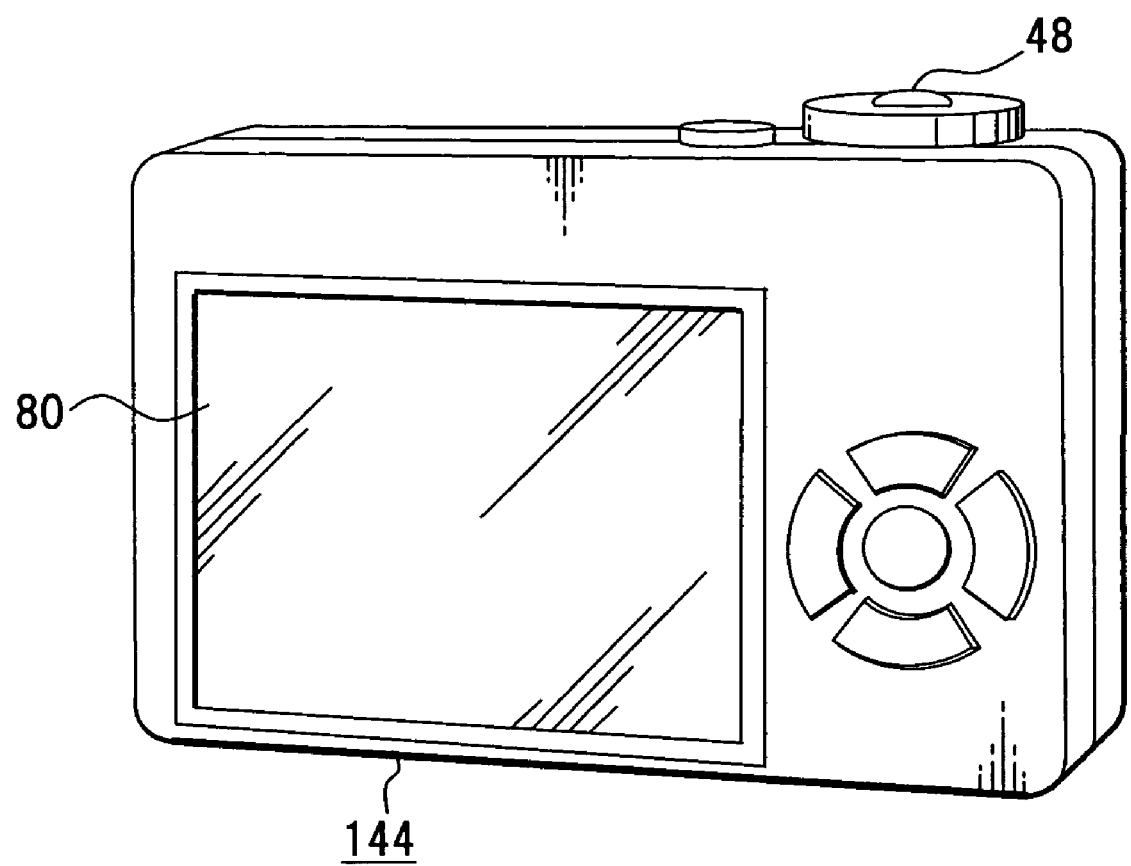
FIG. 34 is a perspective view of a digital camera seen from the rear side in accordance with a thirteenth embodiment of the present invention.

As has been described hereinabove, an electronic device of the present invention includes a digital camera, and for example, a digital camera can be configured as shown in FIG. 33 and FIG. 34. FIG. 33 is a perspective view showing the digital camera as seen from the front side, and FIG. 34 is a perspective view seen from the rear side.

In this digital camera 144, the same symbols as in the above-described embodiments are added to the same portions and the descriptions are omitted. In this case, a speaker 68 and a microphone 70 are disposed in the front side of the digital camera 144.

In the digital camera 144 configured as such, the above described processing and control can be realized as well, accordingly the prevention of inappropriate photographing such as spy shots can be inhibited. Further, an attempt to disable preventive measures against inappropriate photographing through modifications such as cutting a connecting wire of the speaker 68 can be blocked.

<Fourteenth Embodiment>

Figure 35:
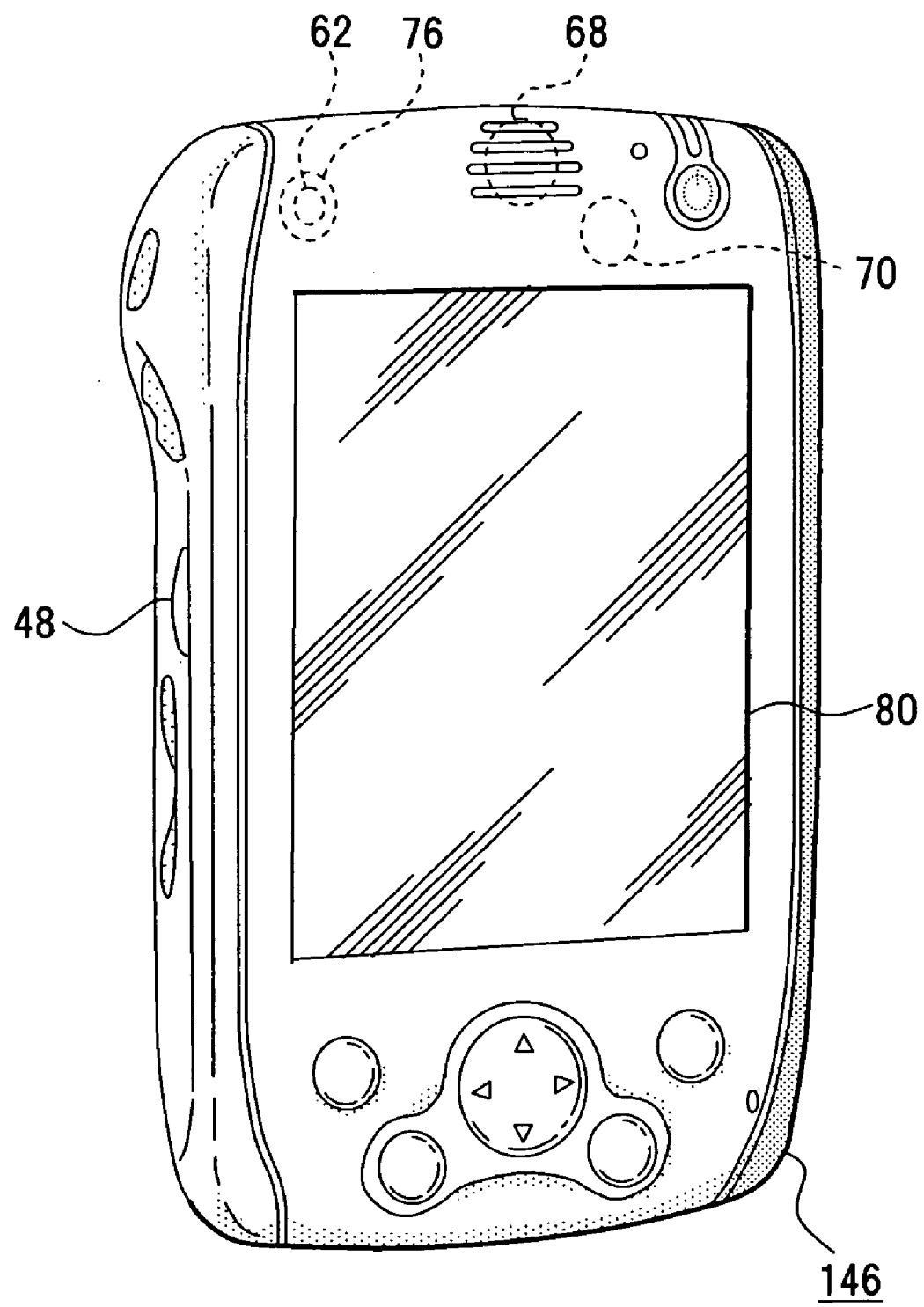
FIG. 35 is a perspective view of a PDA in accordance with a fourteenth embodiment of the present invention.

As has been described hereinabove, an electronic device of the present invention includes an information-processing device, and for example, can be configured as a PDA (Personal Digital Assistant) with a camera function as shown in FIG. 35.

Since this PDA 146 is mounted with a similar configuration as the above-described embodiments, therefore the same symbols are added to the same portions and the descriptions are omitted. This PDA 146 is constructed such that an LCD 80 as an information presenting section is disposed on the front side, a lens 76, a speaker 68, and a microphone 70 are disposed on the rear side, and a shutter button 48 is disposed on a side. In addition, there is a camera sensor 62 on the inside and other configurations in accordance with the above-described embodiments are disposed.

In the PDA 146 configured as such, the above-described processing and control can be realized as well, accordingly the prevention of inappropriate photographing such as spy shots can be inhibited, and an attempt to disable preventive measures against inappropriate photographing through modifications such as cutting a connecting wire of the speaker 68 can be blocked.

<Other Embodiments>

In each embodiment, a judgment is made about whether or not the photographing is permitted, whether or not the image is saved, by using the judgment result that is obtained by using the shutter sound or the light emitted by the shutter operation as a reporting information and by detecting the reporting information. However, an information that are issued during regular operations such as sound or light other than the shutter sound or the light emitted by the shutter operation may be used as the reporting information in order to make a judgment about the photographing permission/prohibition or the image storing. According to this configuration, the function to prevent spy shots through modifications of the electronic device can be enhanced and an electronic device with an enhanced security function can be provided.

Furthermore, in the electronic device according to the tenth embodiment (FIG. 28), the configuration is used in which the subject of photographing 110 issues the notifying information representing permission/prohibition of the photographing to the reporting information requesting photographing permission; however, the mobile phone 40B having received the reporting information representing photographing from the mobile phone 40A (FIG. 27) side may be configured to present only the photographing report without informing the permission/prohibition.

Moreover, in order to leave the evidence of inappropriate photographing such as spy shots, displays of inappropriate photographing or the like that are displayed on the display section may be stored into the frame buffer 82 or RAM 53 as shot images.

In addition, although in the embodiments, a mobile phone, a notebook personal computer, a digital camera, and a PDA are exemplified as the electronic devices, the present invention can be applied to various electronic devices equipped with a camera function, other than the exemplified devices.

A most preferred embodiment and the like of the present invention have been described above. However, the present invention is not limited to the above description; it goes without saying that various modifications and alterations may be made by a person skilled in the art on the basis of the gist of the invention that is described in the claims and disclosed in the detailed description of the invention, and that such modifications and alterations are included in the scope of the present invention.

The entire disclosure of International Patent Application Nos. PCT/JP2004/000175 and PCT/JP03/02641 including specification, claims, drawings and summary are incorporated herein by reference their entirety.

What is claimed is:

1. An electronic device with a camera function, comprising:

a photographing reporting section that issues a reporting information to notify a photographing action to a subject outside the electronic device;

an information detecting section that detects the reporting information issued by the photographing reporting section; and a judging section that judges whether or not the photographing is permitted by using the reporting information detected by the information detecting section.

2. The electronic device of claim 1, further comprising a storage section that stores the reporting information, wherein the reporting information read from the storage section is outputted to the photographing reporting section.

3. The electronic device of claim 1, further comprising a comparing section that compares the reporting information issued from the photographing reporting section with the reporting information detected at the information detecting section, wherein the judging section makes the judgment based on the comparison result of the comparing section.

4. The electronic device of claim 1, further comprising a display section that displays en image, wherein the judging section judges whether or not the image is displayed on the display section by using the reporting information detected at the information detecting section.

5. The electronic device of claim 1, further comprising a storage device that stores an image, wherein the judging section judges whether or not the image is saved into the storage device by using the reporting information detected at the information detecting section.

6. The electronic device of claim 1, further comprising:

an image processing section that alters an image; and a storage device that stores the image altered in the image processing section, wherein the judging section judges whether or not the image is altered at the image processing section and saved into the storage device by using the reporting information detected at the information detecting section.

7. The electronic device of claim 6, further comprising an information presenting section, to which an information representing whether or not the image is saved into the storage device is presented based on the judgment result of the judging section.

8. The electronic device of claim 1, wherein the photographing reporting section emits either a sound or light, or both as the reporting information, and wherein the information detecting section detects either the sound or light, or both emitted by the photographing reporting section as the reporting information.

9. The electronic device of claim 5, wherein the storage device further comprising:

a first storage section storing the image temporarily by the shutter operation; and a second storage section receiving and storing the image from the first storage section based on judging result of the judging section.

10. An electronic device with a camera function, the electronic device comprising:

a transmitting section that transmits in synchronization with the shutter operation a reporting information requesting photographing permission to an opposite electronic device;

a receiving section that receives a notifying information representing whether or not the photographing is permitted from the opposite electronic device; and a judging section that judges whether or not the photographing is permitted by using the notifying information received at the receiving section.

11. An electronic device, comprising:
a receiving section tat receives a reporting information notifying a photographing action to a subject of photographing, which is transmitted from an electronic device with a camera function at a photographing side;
an information presenting section that presents the reporting information received at the receiving section; and
a transmitting section that transmits a notifying information representing whether or not the photographing is permitted to said electronic device at the photographing side in response to said reporting information.

12. A photographing control method of an electronic device with a camera function, the photographing control method comprising the steps of:
issuing a reporting information representing the camera operation mode;
detecting the reporting information issued; and
judging whether or not the photographing is permitted by using the reporting information detected at the information detecting section,
wherein the reporting information is to notify a photographing action to a subject outside the electronic device, and wherein the reporting information is issued in synchronization with the shutter operation.

13. A photographing control program of an electronic device with a camera function, the photographing control program executed by the electronic device, wherein the photographing control program includes the steps of:
making a photographing reporting section issue a reporting information representing the camera operation mode;
capturing the reporting information detected at an information detecting section; and
judging whether or not the photographing is permitted by using the reporting information detected at the information detecting section,
wherein the reporting information is to notify a photographing action to a subject outside of the electronic device, and wherein the reporting information is issued in synchronization with the shutter operation.

14. A processor used for an electronic device with a camera function, the processor being connected to: a camera sensor detecting an image through a lens; a photographing reporting section that issues in synchronization with the shutter operation a reporting information representing the camera operation mode to notify a photographing action to a subject outside the electronic device; an information detecting section that detects the reporting information issued by the photographing reporting section; a judging section that judges whether or not the photographing is permitted by using the reporting information detected at the information detecting section and a storage device that stores the image,
wherein the image obtained on the camera sensor is saved into the storage device, based on the judgment result of the judging section.

15. A processor used for an electronic device with a camera function, the processor being connected to: a camera sensor capturing an image through a lens; a photographing reporting section that issues in synchronization with the shutter operation a reporting information representing the camera operation mode to notify a photographing action to a subject outside the electronic device; an information detecting section that detects the reporting information issued by the photographing reporting section; a judging section that judges whether or not the photographing is permitted by using the reporting information detected at the information detecting section; and a storage device that stores the image,
wherein the image is altered and saved into the storage device, based on the judgment result of the judging section.

16. A processor used for an electronic device with a camera function, the processor being connected to: a camera sensor capturing an image through a lens; a photographing reporting section that issues in synchronization with the shutter operation a reporting information representing the camera operation mode to notify a photographing action to a subject outside the electronic device; an information detecting section that detects the reporting information issued by the photographing reporting section; a judging section that judges whether or not the photographing is permitted by using the reporting information detected at the information detecting section; a storage device that stores the image; and an information presenting section that presents an information,
wherein the information representing the judgment result of the judging section is presented to the information presenting section.

17. A processor used for an electronic device with a camera function, the processor being connected to: a camera sensor capturing an image through a lens; a transmitting section that transmits in synchronization with the shutter operation a reporting information requesting photographing permission to a second electronic device outside of the electronic device to notify a photographing action to the second electronic device; a receiving section that receives a notifying information whether or not the photographing is permitted from the second electronic device; a judging section that judges whether or not the photographing is permitted by using the notifying information received by the receiving section; and a storage device that stores the image,
wherein the image obtained on the camera sensor is captured into the storage device, based on the judgment result of the judging section.

18. The processor of claim 14, wherein the storage device further comprising:
a first storage section that saves the image temporarily by the shutter operation; and
a second storage section tat receives and saves the image from the first storage section,
wherein the image in the first storage section is saved into the second storage section based on the judgment result of the judging section.

19. The processor of claim 14, further comprising a storage section that stores a reporting information, from which the reporting information is outputted to the photographing reporting section based on the shutter operation.

20. The processor of claim 14, wherein the judging section makes the judgment from the comparison result of a comparing section that compares the reporting information issued from the photographing reporting section with the reporting information detected at the information detecting section and supplies the reporting information to the comparing section.

21. The processor of claim 15, wherein the storage device further comprising:
a first storage section that saves the image temporarily by the shutter operation; and
a second storage section that receives and saves the image from the first storage section, wherein the image in the first storage section is saved into the second storage section based on the judgment result of the judging section.

22. The processor of claim 15, further comprising a storage section that stores a reporting information, from which the reporting information is outputted to the photographing reporting section based on the shutter operation.

23. The processor of claim 15, wherein the judging section makes the judgment from the comparison result of a comparing section that compares the reporting information issued from the photographing reporting section with the reporting information detected at the information detecting section and supplies the reporting information to the comparing section.

24. The processor of claim 16, wherein the storage device further comprising:
   a first storage section that saves the image temporarily by the shutter operation; and
   a second storage section that receives and saves the image from the first storage section,
   wherein the image in the first storage section is saved into the second storage section based on the judgment result of the judging section.

25. The processor of claim 16, further comprising a storage section that stores a reporting information, from which the reporting information is outputted to the photographing reporting section based on the shutter operation.

26. The processor of claim 16, wherein the judging section makes the judgment from the comparison result of a comparing section that compares the reporting information issued from the photographing reporting section with the reporting information detected at the information detecting section and supplies the reporting information to the comparing section.

27. The processor of claim 17, wherein the storage device further comprising:
   a first storage section tat saves the image temporarily by the shutter operation; and
   a second storage section that receives and saves the image from the first storage section,
   wherein the image in the first storage section is saved into the second storage section based on the judgment result of the judging section.

28. The processor of claim 17, further comprising a storage section that stores a reporting information, from which the reporting information is outputted to the photographing reporting section based on the shutter operation.

29. The processor of claim 17, wherein the judging section makes the judgment from the comparison result of a comparing section that compares the reporting information issued from the photographing reporting section with the reporting information detected at the information detecting section and supplies the reporting information to the comparing section.

* * * * *

UNITED STATES PATENT AND TRADEMARK OFFICE
CERTIFICATE OF CORRECTION

| | | |
|---|---|---|
| PATENT NO. | : 7,110,666 B2 | Page 1 of 1 |
| APPLICATION NO. | : 11/216095 | |
| DATED | : September 10, 2007 | |
| INVENTOR(S) | : Yuuichi Abe et al. | |

It is certified that error appears in the above-identified patent and that said Letters Patent is hereby corrected as shown below:

<u>On Claims</u>

Please correct "tat" into --that-- on column 31, line 2, column 32, line 45, and column 34, line 9.

Signed and Sealed this

Twenty-first Day of August, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,110,666 B2 |
| APPLICATION NO. | : 11/216095 |
| DATED | : September 19, 2006 |
| INVENTOR(S) | : Yuuichi Abe et al. |

It is certified that error appears in the above-identified patent and that said Letters Patent is hereby corrected as shown below:

<u>On Claims</u>

Please correct "tat" into --that-- on column 31, line 2, column 32, line 45, and column 34, line 9.

This certificate supersedes Certificate of Correction issued August 21, 2007.

Signed and Sealed this

Eighteenth Day of September, 2007

JON W. DUDAS
*Director of the United States Patent and Trademark Office*